US012535215B2

(12) United States Patent
Naik et al.

(10) Patent No.: US 12,535,215 B2
(45) Date of Patent: Jan. 27, 2026

(54) COMBUSTOR INCLUDING A STEAM INJECTOR OPERABLY INJECTING STEAM INTO A TRAPPED VORTEX CAVITY

(71) Applicant: General Electric Company, Schenectady, NY (US)

(72) Inventors: Pradeep Naik, Bengaluru (IN); Clayton S. Cooper, Loveland, OH (US); Perumallu Vukanti, Bengaluru (IN); Michael A. Benjamin, Cincinnati, OH (US); Steven C. Vise, Loveland, OH (US); Sripathi Mohan, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/453,506

(22) Filed: Aug. 22, 2023

(65) Prior Publication Data

US 2025/0067439 A1  Feb. 27, 2025

(51) Int. Cl.
  *F02C 3/30* (2006.01)
  *F23R 3/28* (2006.01)
(52) U.S. Cl.
  CPC .............. *F23R 3/286* (2013.01); *F02C 3/30* (2013.01); *F02C 3/305* (2013.01); *F23R 2900/00015* (2013.01)
(58) Field of Classification Search
  CPC .... F23R 3/34; F23R 3/42; F23R 2900/00015; F02C 3/30; F02C 3/305
  See application file for complete search history.

(56) References Cited

U.S. PATENT DOCUMENTS 3,359,723 A * 12/1967 Bohensky ................. F02C 7/16
  60/39.55
3,742,703 A    7/1973 Melconian
  (Continued)

FOREIGN PATENT DOCUMENTS

| EP | 0499535 A1 | 8/1992 | |
| WO | WO-2011113400 A1 * | 9/2011 | ............ F02C 3/30 |
| WO | 2022101608 A1 | 5/2022 | |

OTHER PUBLICATIONS

English translation of WO 2011/113400 A1 (Year: 2011).*
(Continued)

*Primary Examiner* — Thomas P Burke
(74) *Attorney, Agent, or Firm* — Venable LLP; Peter T. Hrubiec; Michele V. Frank

(57) ABSTRACT

A combustor includes a combustion chamber having an outer liner and an inner liner and defining a first combustion zone, an annular dome coupled to the outer liner and the inner liner, and a trapped vortex cavity extending from at least one of the outer liner or the inner liner and defining a second combustion zone. A plurality of first mixing assemblies are disposed through the annular dome, and operably inject a first fuel-air mixture into the first combustion zone. A plurality of second mixing assemblies are disposed at the trapped vortex cavity, and operably inject a second fuel-air mixture into the second combustion zone defined in the trapped vortex cavity to produce combustion gases. A steam system includes a steam injector in fluid communication with the trapped vortex cavity. The steam injector operably injects steam into the trapped vortex cavity and the steam mixes with the combustion gases.

20 Claims, 12 Drawing Sheets

(56) References Cited

U.S. PATENT DOCUMENTS

| | | | |
|---|---|---|---|
| 4,532,762 A | 8/1985 | Mongia et al. | |
| 4,545,196 A | 10/1985 | Mongia et al. | |
| 4,819,438 A * | 4/1989 | Schultz | F23M 5/08 |
| | | | 165/83 |
| 5,054,279 A * | 10/1991 | Hines | F01K 21/047 |
| | | | 60/39.5 |
| 5,127,221 A | 7/1992 | Beebe | |
| 5,473,882 A | 12/1995 | Zarzalis et al. | |
| 6,173,561 B1 * | 1/2001 | Sato | F23R 3/005 |
| | | | 60/757 |
| 6,951,108 B2 | 10/2005 | Burrus et al. | |
| 10,837,641 B2 | 11/2020 | Ogata et al. | |
| 10,976,052 B2 | 4/2021 | Boardman et al. | |
| 10,976,053 B2 | 4/2021 | Boardman et al. | |
| 11,181,269 B2 | 11/2021 | Boardman et al. | |
| 11,313,561 B2 | 4/2022 | Roh | |
| 2001/0037646 A1 * | 11/2001 | Shimizu | F23M 5/08 |
| | | | 60/752 |
| 2004/0103663 A1 | 6/2004 | Haynes et al. | |
| 2006/0107667 A1 * | 5/2006 | Haynes | F23R 3/346 |
| | | | 60/737 |
| 2011/0185735 A1 * | 8/2011 | Snyder | F23R 3/346 |
| | | | 60/746 |
| 2013/0199188 A1 * | 8/2013 | Boardman | F23R 3/286 |
| | | | 60/737 |
| 2014/0260314 A1 * | 9/2014 | Koganezawa | F02C 9/40 |
| | | | 60/787 |
| 2021/0293412 A1 | 9/2021 | Boardman et al. | |
| 2022/0186929 A1 | 6/2022 | Aoki et al. | |
| 2023/0392557 A1 * | 12/2023 | Bulat | F23R 3/36 |
| 2025/0075911 A1 * | 3/2025 | Naik | F23R 3/286 |

OTHER PUBLICATIONS

Database WPI, week 2022058, Thomson Scientific, London, GB;, and CN 114 608 032 A (AECC Sichuan Gas Turbine Estab), Jun. 10, 2022.

* cited by examiner

COMBUSTOR INCLUDING A STEAM INJECTOR OPERABLY INJECTING STEAM INTO A TRAPPED VORTEX CAVITY

TECHNICAL FIELD

The present disclosure relates generally to combustors, for example, for turbine engines.

BACKGROUND

A turbine engine generally includes a fan and a core section arranged in flow communication with one another. A combustor is arranged in the core section to generate combustion gases for driving a turbine in the core section of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
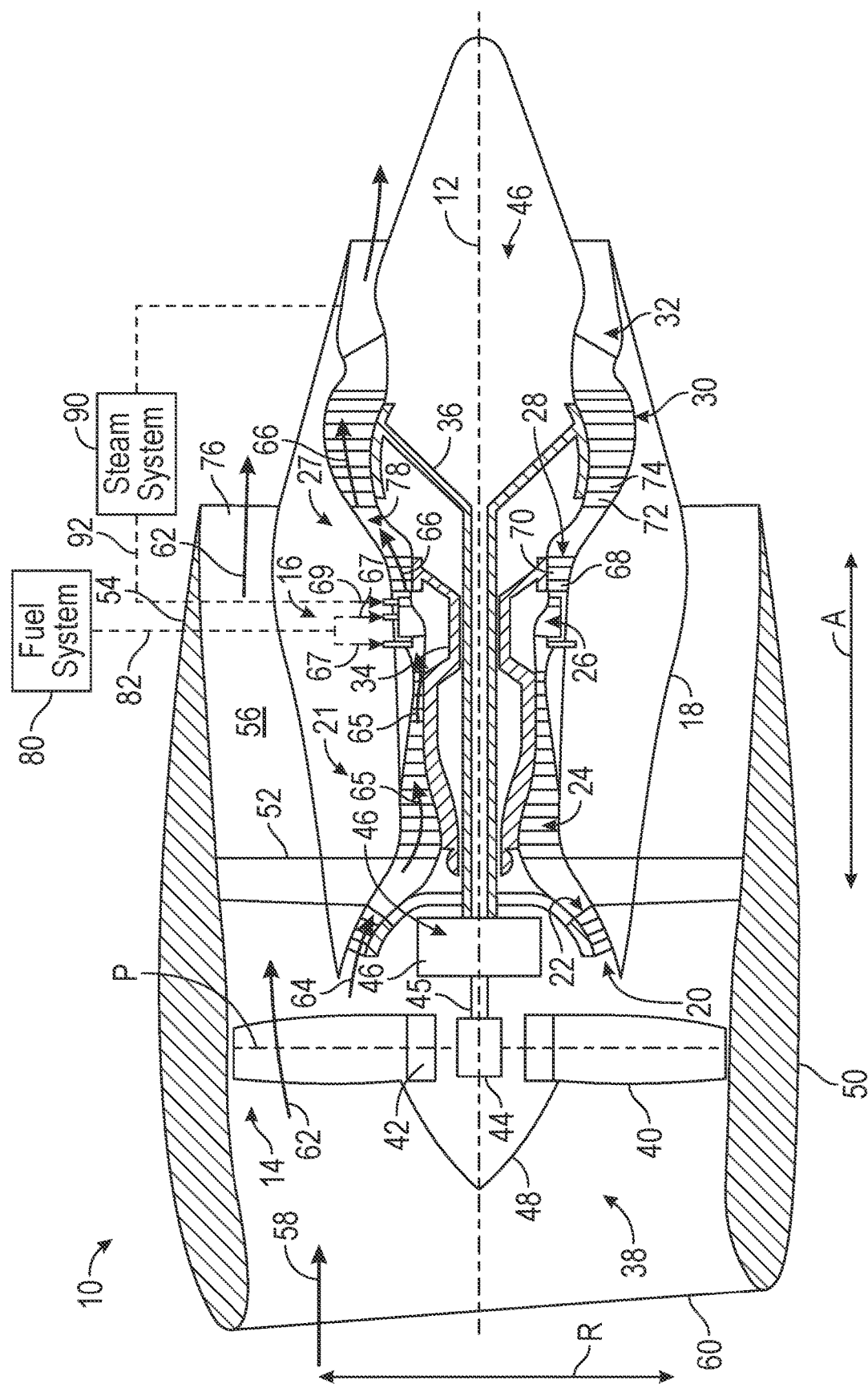
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the terms "low," "mid" (or "mid-level"), and "high," or their respective comparative degrees (e.g., "lower" and "higher", where applicable), when used with compressor, combustor, turbine, shaft, fan, or turbine engine components, each refers to relative pressures, relative speeds, relative temperatures, or relative power outputs within an engine unless otherwise specified. For example, a "low-power" setting defines the engine or the combustor configured to operate at a power output lower than a "high-power" setting of the engine or the combustor, and a "mid-level power" setting defines the engine or the combustor configured to operate at a power output higher than a "low-power" setting and lower than a "high-power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The various power levels of the turbine engine detailed herein are defined as a percentage of a sea level static (SLS) maximum engine rated thrust. Low-power operation or conditions includes, for example, less than thirty percent (30%) of the SLS maximum engine rated thrust of the turbine engine. Mid-level power operation or conditions includes, for example, thirty percent (30%) to eighty-five (85%) of the SLS maximum engine rated thrust of the turbine engine. High-power operation or conditions includes, for example, greater than eighty-five percent (85%) of the SLS maximum engine rated thrust of the turbine engine. The values of the thrust for each of the low-power operation, the mid-level power operation, and the high-power operation of the turbine engine are exemplary only, and other values of the thrust can be used to define the low-power operation, the mid-level power operation, and the high-power operation.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, the terms "trapped vortex cavity" or "TVC" generally refer to one or more cavities of a combustor that are in fluid communication with a main combustion chamber of the combustor and that at least partially mix a fuel in a swirling vortex of compressed air within the one or more cavities.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

Combustors for turbine engines, such as turbine engines for aircraft, ignite fuel and air mixtures to produce combustion gases, which in turn drive one or more turbines of the turbine engine, thereby rotating one or more loads (e.g., a fan, a propeller, etc.). Air pollution concerns have led to stricter combustion emissions standards. Such standards regulate the emission of nitrogen oxide ($NO_x$), non-volatile particulate matter (nvPM), as well as other types of exhaust emissions, from the turbine engine. The nvPM includes, for example, soot, smoke, or the like. Generally, $NO_x$ is formed during the combustion process due to high flame temperatures in the combustor. Turbine engine design tradeoffs are necessary to meet requirements for noise, emissions, fuel burn, cost, weight, and performance. As temperatures in the combustor increase, $NO_x$ generation increases due to the higher temperatures. In turbine engine design, balancing a reduction in $NO_x$ emissions, nvPM emissions, carbon monoxide (CO), and noise, while achieving improved engine performance, is difficult. For example, combustor design changes to achieve lower emissions must not impact the ability of the combustion system to satisfy performance and certification requirements throughout the operating cycle of the aircraft.

In addition to balancing a reduction in emissions while achieving improved engine performance, another tradeoff is reducing the specific fuel consumption (SFC) of the turbine engine. The specific fuel consumption is the amount of fuel consumed by the turbine engine for each unit of power output. Accordingly, a lower SFC means that less fuel is consumed to achieve a particular power output of the turbine engine. Some turbine engines utilize combustors in which the steam is injected through the fuel nozzle into the combustion chamber. Injecting steam into the combustion chamber reduces the SFC while also reducing $NO_x$ emissions. For example, the more steam that is injected into the combustor, the more the SFC will be reduced. Steam in the combustion, however, increases CO emissions and can lead to flameout as the steam chokes the flame (e.g., reduces oxygen in the combustion chamber). Further, such turbine engines that inject the steam from the fuel nozzle can achieve up to about 5% water-to-air ratios (WARs) within the combustor before flameout occurs. Thus, such turbine engines are limited in the amount of emissions and SFC reduction that can be achieved with the steam injection prior to flameout.

Accordingly, embodiments of the present disclosure provide systems and methods to balance the requirements in turbine engines of low fuel burn and low emissions (e.g., $NO_x$ emissions, nvPM emissions, CO, and noise) while balancing turbine engine performance, reduced SFC, and avoiding flameout in the combustor. Embodiments of the present disclosure provide for a turbine engine having a combustor with a trapped vortex cavity (TVC) that is in fluidic communication with the main combustion zone of a combustion chamber of the combustor. A first flame is generated in the main combustion zone within the combustion chamber, and the first flame generates combustion gases within the combustion chamber. A second flame is generated in the TVC that produces combustion gases within the TVC. The turbine engine includes a steam system that generates steam from the exhaust of the turbine engine. The steam system injects the steam downstream or upstream of the second flame within the TVC. The steam mixes with combustion gases within the TVC, and then the TVC injects the steam and combustion gases into the combustion chamber downstream of the main combustion zone. The first flame in the main combustion zone provides for flame stability within the combustor at different operating conditions (e.g., low-power, mid-power, and high-power).

The TVC enables a greater amount of steam to be injected into the combustor without sacrificing operability of the combustor, as compared to combustors without the benefit of the present disclosure. For example, the steam is injected into the TVC, away from the main combustion zone, to avoid flameout of the first flame in the main combustion zone as the steam is kept away from the first flame. Such a configuration of injecting the steam downstream of the flames and within the TVC enables a greater amount of steam that can be injected into the combustor for reduced emissions and reduced SFC, while providing for flame stability (e.g., avoiding flameout), as compared to combustors without the benefit of the present disclosure. The present disclosure provides for WARs of up to 60%, thereby enabling a great amount of steam to reduce the emissions and to reduce the SFC, while providing for flame stability in the combustor (e.g., avoiding flameout).

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27, including a high pressure (HP) turbine 28, followed downstream by a low pressure (LP) turbine 30, and a jet exhaust nozzle section 32. A high pressure (HP) shaft 34 or a spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 or the fan section 14. As the volume of air 58 passes across the fan blades 40, a first portion of air 62 is directed or routed into the bypass airflow passage 56, and a second portion of air 64 is directed or is routed into the upstream section of the core air flow path, or, more specifically, into the annular inlet 20 of the LP compressor 22. The ratio between the first portion of air 62 and the second portion of air 64 is commonly known as a bypass ratio. The pressure of the second portion of air 64 is then increased, forming compressed air 65, and the compressed air 65 is routed through the HP compressor 24 and into the combustion section 26, where the compressed air 65 is mixed with fuel and burned to provide combustion gases 66.

The combustion gases 66 are routed into the HP turbine 28 and expanded through the HP turbine 28 where a portion of thermal energy and kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal energy and the kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

As detailed above, the second portion of air 64 is mixed with fuel 67 in the combustion section 26 to produce the combustion gases 66. The turbine engine 10 also includes a fuel system 80 for providing the fuel 67 to the combustion section 26. The fuel system 80 includes a fuel tank (not shown) for storing fuel therein and one or more fuel injector lines 82 to provide the fuel 67 to the combustion section 26, as detailed further below. The fuel system 80 can include one or more valves for controlling an amount of the fuel 67 provided to the combustion section 26. The fuel 67 can be any type of fuel used for turbine engines including liquid fuel or gaseous fuel. For example, the fuel 67 can be JetA, sustainable aviation fuels (SAF) including biofuels, hydrogen-based fuel ($H_2$), or the like.

The turbine engine 10 includes a steam system 90 in fluid communication with the jet exhaust nozzle section 32. The steam system 90 extracts steam 69 from exhaust in the jet exhaust nozzle section 32. The steam system 90 includes one or more steam lines 92 to provide the steam 69 to the combustion section 26, as detailed further below.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2:
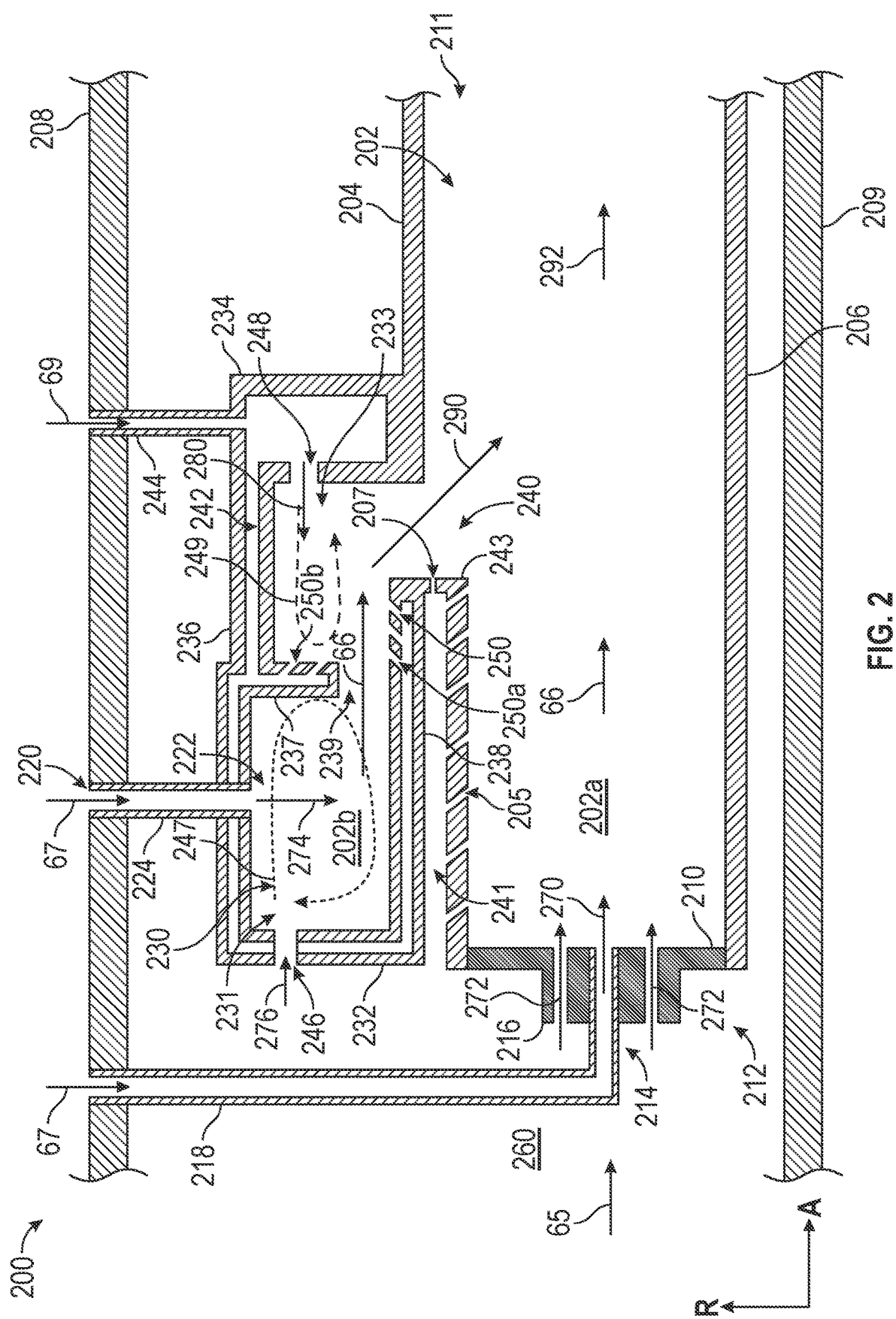
FIG. 2 is a schematic cross-sectional diagram of a combustor for the turbine engine of FIG. 1, taken along a longitudinal centerline axis of the turbine engine, according to the present disclosure.

FIG. 2 is a schematic cross-sectional diagram of a combustor 200 for the turbine engine 10 (FIG. 1), taken along the longitudinal centerline axis 12 (FIG. 1) of the turbine engine 10 (FIG. 1). In the exemplary embodiment, the combustion section 26 (FIG. 1) includes the combustor 200 having a combustion chamber 202 defined by an outer liner 204 and an inner liner 206. The combustor 200 is an annular combustor. The combustor 200, however, can include any type of combustor, such as, for example, annular combustors, double annular combustors, can-annular combustors, or the like.

The outer liner 204 and the inner liner 206 are annular about the longitudinal centerline axis 12 of the turbine engine 10 (FIG. 1). The outer liner 204 defines a radially outer boundary of the combustion chamber 202, and the inner liner 206 defines a radially inner boundary of the combustion chamber 202. The outer liner 204 and the inner liner 206 are spaced radially inward from an outer combustor casing 208 and an inner combustor casing 209, respectively, that extend circumferentially about the outer liner 204 and the inner liner 206. At least one of the outer liner 204 or the inner liner 206 includes one or more liner air holes 205 that operably direct the compressed air 65 through the at least one of the outer liner 204 or the inner liner 206, and into the combustion chamber 202 to cool the at least one of the outer liner 204 or the inner liner 206 (e.g., by film cooling). The combustor 200 also includes an annular dome 210 upstream from and coupled to the outer liner 204 and the inner liner 206. The annular dome 210 defines an upstream end of the combustion chamber 202. The combustion chamber 202 extends from the annular dome 210 to a combustion chamber outlet 211.

A plurality of first mixing assemblies 212 (only one is illustrated in FIG. 2) is spaced circumferentially about the annular dome 210 to deliver a first mixture of fuel and air to the combustion chamber 202. For example, the plurality of first mixing assemblies 212 delivers the first mixture of fuel and air into a first combustion zone 202a of the combustion chamber 202, as detailed further below. The first combustion zone 202a is also referred to as a main combustion zone. In FIG. 2, the first mixing assembly 212 is illustrated as including a first mixer 214 and a first mixing assembly swirler 216. The combustor 200 includes a plurality of first fuel injectors 218 (only one is illustrated in FIG. 2), with each first fuel injector 218 of the plurality of first fuel injectors 218 coupled in flow communication with each respective first mixing assembly 212. The plurality of first fuel injectors 218 is spaced circumferentially about the annular dome 210 and extend radially from the outer combustor casing 208 to the plurality of first mixing assemblies 212. In some embodiments, the plurality of first fuel injectors 218 extends from the inner combustor casing 209, or can extend from both the outer combustor casing 208 and the inner combustor casing 209.

A plurality of second mixing assemblies 220 (only one illustrated in FIG. 2) is spaced circumferentially about the outer liner 204 to deliver a second mixture of fuel and air to a second combustion zone 202b, as detailed further below. The second combustion zone 202b is also referred to as a secondary combustion zone. The second combustion zone 202b is configured to eject combustion gases 66 from the second combustion zone 202b axially aft of the first combustion zone 202a, as detailed further below. Each of the plurality of second mixing assemblies 220 includes a second mixer 222. A plurality of second fuel injectors 224 (only one is illustrated in FIG. 2) is coupled in flow communication with each respective second mixing assembly 220. The plurality of second fuel injectors 224 is spaced circumferentially about the outer liner 204 and extends radially from the outer combustor casing 208 to the plurality of second mixing assemblies 220.

The combustor 200 includes TVC 230 that extends from the outer liner 204 that defines the second combustion zone 202b. While one TVC 230 is shown and described in FIG. 2, the combustor 200 can include one or more TVCs 230. The TVC 230 is a cavity and is utilized to produce trapped vortices of a fuel-air mixture, as detailed further below. For example, the plurality of second mixing assemblies 220 is positioned to inject the fuel 67 radially into the TVC 230, as detailed further below. While FIG. 2 shows the TVC 230 extending from the outer liner 204, the TVC 230 can extend from the inner liner 206. In some embodiments, both the outer liner 204 and the inner liner 206 include a TVC 230 extending therefrom. The TVC 230 includes an outlet that is located axially aft of the annular dome 210. In this way, the TVC 230 operably injects the combustion gases 66 downstream of the annular dome 210.

The TVC 230 is defined by one or more walls (collectively referred to as the "walls" of the TVC 230). For example, the TVC 230 is defined by a first wall 232, a second wall 234, a third wall 236, and a fourth wall 238. The first wall 232 and the second wall 234 extend generally radially, and the third wall 236 and the fourth wall 238 extend generally axially. The first wall 232 defines a forward wall of the TVC 230, the second wall 234 defines an aft wall of the TVC 230, the third wall 236 defines a first axial wall of the TVC 230, and the fourth wall 238 defines a second axial wall of the TVC 230. The second wall 234 is spaced axially aft of the first wall 232. The first wall 232 extends generally radially from a forward end of the third wall 236 to a forward end of the fourth wall 238. The second wall 234 extends generally radially to an aft end of the third wall 236. The third wall 236 is spaced radially outward from the fourth wall 238. The third wall 236 extends generally axially from a radially outer end of the first wall 232 to a radially outer end the second wall 234. The fourth wall 238 extends generally axially from a radially inner end of the first wall 232 to a TVC opening 240 that is defined between an aft end of the fourth wall 238 and an axially forward surface of the second wall 234.

The TVC 230 is defined between the first wall 232, the second wall 234, the third wall 236, and the fourth wall 238. In this way, the TVC 230 is located generally radially outward from the combustion chamber 202. The TVC opening 240 is an opening in the outer liner 204 to provide flow communication from the TVC 230 to the combustion chamber 202. In particular, the TVC opening 240 is positioned downstream of the first combustion zone 202a. While the TVC 230 illustrated in FIG. 2 includes a substantially rectangular cross section, the TVC 230 can include any shape.

The TVC 230 includes a partition wall 237 that extends radially inward from the third wall 236 into the TVC 230. The partition wall 237 axially divides the TVC 230 into an upstream portion 231 and a downstream portion 233 that is downstream of the upstream portion 231. In this way, the downstream portion 233 is axially aft of the upstream portion 231. The upstream portion 231 is sized to contain the second combustion zone 202b such that a first vortex 247 of compressed air 65 is formed within the upstream portion 231 and combustion occurs in the upstream portion 231, as detailed further below. The downstream portion 233 is sized to receive the steam 69. For example, the upstream portion 231 is defined axially aftward from the first wall 232 to approximately 50% of a total axial length of the TVC 230. The upstream portion 231, however, can be defined to any portion of the total axial length of the TVC 230, as long as there is space within the upstream portion 231 for generating a vortex within the upstream portion 231 and space within the downstream portion 333 for steam injection within the downstream portion 333. The partition wall 237 extends only partially into the TVC 230 such that a gap 239 is defined radially between the partition wall 237 and the fourth wall 238. In some embodiments, the partition wall 237 extends radially outward from the fourth wall 238 into the TVC 230 to axially separate the TVC 230 into the upstream portion 231 and the downstream portion 233. In such embodiments, the gap 239 is defined radially between the partition wall 237 and the third wall 236. The upstream portion 231 defines the second combustion zone 202b, and the TVC opening 240 is defined at the downstream portion 233. In FIG. 2, the upstream portion 231 is a primary TVC and the downstream portion is a secondary TVC, as detailed further below. A volume of the upstream portion 231 is greater than a volume of the downstream portion 233. Such a configuration provides for a sufficient amount of time for completing combustion within the upstream portion 231. In some embodiments, the volume of the upstream portion 231 is less than the volume of the downstream portion 233. Such a configuration provides for a sufficient amount of time for the steam 69 in the downstream portion 233 to mix with the combustion gases 66 from the upstream portion 231, as detailed further below. In some embodiments, the volume of the upstream portion 231 is substantially equal to or less than the downstream portion 233.

The fourth wall 238 is spaced radially from the outer liner 204 such that a gap 241 is defined between the fourth wall 238 and the outer liner 204. The gap 241 allows for cooling air (e.g., the compressed air 65) to cool a forward portion of the outer liner 204 (e.g., the portion forward of the TVC opening 240) and to cool the fourth wall 238. The fourth wall 238 is coupled to the outer liner 204 by a liner extension portion 243 that extends from the outer liner 204 to an aft end of the fourth wall 238. The liner extension portion 243 connects the fourth wall 238 and the outer liner 204. The liner extension portion 243 includes one or more liner extension portion holes 207 that extend generally axially through the liner extension portion 243. The one or more liner extension portion holes 207 operably direct the compressed air 65 through the liner extension portion 243 and into the combustion chamber 202 to cool the liner extension portion 243.

At least one of the walls that define the TVC 230 includes a steam path 242 defined therein. For example, the first wall 232, the second wall 234, the third wall 236, the fourth wall 238, and the partition wall 237 each includes a portion of the steam path 242 such that the steam path 242 is disposed within the first wall 232, the second wall 234, the third wall 236, and the fourth wall 238. The steam system 90 (FIG. 1) includes a steam injector 244 in fluid communication with the steam path 242 for supplying the steam 69 to the steam path 242. For example, the steam system 90 supplies the steam 69 to the steam injector 244 through the one or more steam lines 92 (FIG. 1), and the steam 69 fills the steam path 242 within the walls of the TVC 230. In this way, the steam 69 cools the walls of the TVC 230. The steam injector 244 is disposed through the third wall 236 and is positioned generally axially aligned with the second wall 234. The steam injector 244, however, can be positioned anywhere along the walls of the TVC 230.

The TVC 230 includes one or more TVC air holes 246 defined through the first wall 232. The one or more TVC air holes 246 operably direct the compressed air 65 through the first wall 232 into the TVC 230 and generate the first vortex 247. A size of each of the one or more TVC air holes 246, a number of the one or more TVC air holes 246, and the circumferential spacing between respective ones of the one or more TVC air holes 246 is based on an amount of vortex airflow desired to generate the first vortex 247 within the TVC 230. In addition, the one or more TVC air holes 246 are generally circular openings, but other shapes may be implemented for the openings instead. For example, the one or more TVC air holes 246 can be oval-shaped slots, or the like.

The steam system 90 also includes one or more steam injection holes 248 and one or more steam cooling holes 250 defined through at least one of the walls of the TVC 230. For example, the one or more steam injection holes 248 are defined through the second wall 234. The one or more steam injection holes 248 provide fluid communication between the steam path 242 and the TVC 230. In this way, the steam injector 244 is in fluid communication with the TVC 230. The one or more steam injection holes 248 operably direct the steam 69 from the steam path 242 through the second wall 234 into the TVC 230 and generate a second vortex 249. The first vortex 247 and the second vortex 249 are counter-rotating. In some embodiments, the first vortex 247 and the second vortex 249 rotate in the same direction. A size of each of the one or more steam injection holes 248, a number of the one or more steam injection holes 248, and the circumferential spacing between respective ones of the one or more steam injection holes 248 is based on a desired amount of vortex airflow desired to generate the second vortex 249 within the TVC 230. In addition, while in the embodiment of FIG. 2 the one or more steam injection holes 248 are generally circular openings, other shapes can be implemented for the openings instead. For example, the one or more steam injection holes 248 can be oval-shaped slots, or the like.

The TVC 230 includes the one or more steam cooling holes 250 disposed through one or more of the walls of the TVC 230. The one or more steam cooling holes 250 provide fluid communication between the steam path 242 and the TVC 230 for cooling the walls of the TVC 230 with the steam 69 (e.g., by film cooling). In particular, the one or more steam cooling holes 250 are disposed to provide fluid communication between the steam path 242 and the downstream portion 233. The one or more steam cooling holes 250 include one or more first steam cooling holes 250a disposed through the fourth wall 238 and one or more second steam cooling holes 250b disposed through the partition wall 237. The one or more first steam cooling holes 250a operably direct the steam 69 from the steam path 242 therethrough to cool the fourth wall 238. The one or more second steam cooling holes 250b operably direct the steam 69 from the steam path 242 therethrough to cool the partition wall 237. The combustor 200 also includes a diffuser section 260 defined between the outer combustor casing 208 and the inner combustor casing 209 and upstream of the combustion chamber 202 and the plurality of TVCs 230 (e.g., upstream of the annular dome 210). The diffuser section 260 is in fluid communication with the HP compressor 24 (FIG. 1) for receiving the compressed air 65 from the HP compressor 24.

In operation, the combustor 200 receives the compressed air 65 that is discharged from the HP compressor 24 (FIG. 1) in the diffuser section 260 at a location upstream of the combustion chamber 202. A portion of the compressed air 65 is channeled through the first mixing assembly 212. For example, the compressed air 65 is channeled through the first mixing assembly swirler 216, and the first mixing assembly swirler 216 swirls the compressed air 65. At the first mixing assembly 212, the compressed air 65 is mixed with the fuel 67 from the first fuel injector 218 and discharged into the combustion chamber 202. The first fuel injector 218 injects the fuel 67 axially aftward into the first combustion zone 202a of the combustion chamber 202 to generate a first fuel stream 270. At the first mixer 214, the first fuel stream 270 is mixed with a first compressed air stream 272 to generate a first fuel-air mixture. The first fuel-air mixture is fuel-rich (e.g., higher fuel-to-air ratios within the mixture). The first fuel-air mixture is ignited by an igniter (not shown in FIG. 2 for clarity) for generating a first flame within the combustion chamber 202 that burns the first fuel-air mixture and provides combustion gases 66 that are channeled downstream to a first stage turbine nozzles of the HP turbine 28 (FIG. 1). The first flame burns within the first combustion zone 202a (e.g., adjacent to the first mixer 214 and within an area of the annular dome 210) and generates the combustion gases 66 within the combustion chamber 202.

A portion of the compressed air 65 is also injected through the one or more TVC air holes 246 into the TVC 230. For example, the compressed air 65 is injected axially aftward through the one or more TVC air holes 246 into the upstream portion 231. The compressed air 65 injected into the upstream portion 231 produces the first vortex 247 within the upstream portion 231. The second fuel injector 224 injects the fuel 67 radially into the upstream portion 231. For example, the plurality of second mixing assemblies 220 is disposed through the third wall 236 such that the second fuel injector 224 injects the fuel 67 radially into the upstream portion 231. In the upstream portion 231, the fuel 67 includes a second fuel stream 274 that is mixed with a second compressed air stream 276 to generate a second fuel-air mixture. The second fuel-air mixture is more fuel-lean (e.g., lower fuel-to-air ratios within the mixture) than the first fuel-air mixture. The second fuel-air mixture is ignited by an igniter (not shown in FIG. 2 for clarity) for generating a second flame within the upstream portion 231 (e.g., in the second combustion zone 202b) that burns the second fuel-air mixture and provides combustion gases 66 that are channeled downstream to the downstream portion 233. The first vortex 247 traps the second flame within the upstream portion 231 such that the fuel-air mixture combusts entirely within the upstream portion 231 and produces the combustion gases 66 within the upstream portion 231. In this way, the upstream portion 231 is a primary TVC that traps the second flame via the first vortex 247.

The TVC 230 operably directs the combustion gases 66 from the upstream portion 231, through the gap 239, and into the downstream portion 233, in which the combustion gases 66 mix with the steam 69. For example, the one or more steam injection holes 248 operably direct the steam 69 from the steam path 242 and into the downstream portion 233, thereby generating a steam injection stream 280 and generating the second vortex 249 within the downstream portion 233. In this way, the steam injection stream 280 is downstream of the second fuel-air mixture. The one or more steam injection holes 248 operably direct the steam 69 axially forward into the downstream portion 233. The second vortex 249 operably mixes the combustion gases 66 from the upstream portion 231 with the steam injection stream 280 to generate a first steam-combustion gases mixture 290. The downstream portion 233 operably directs the first steam-combustion gases mixture 290 through the TVC opening 240 and into the combustion chamber 202 downstream of the first combustion zone 202a. The combustion gases 66 from the first combustion zone 202a mix with the first steam-combustion gases mixture 290 from the TVC 230 within the combustion chamber 202 to generate a second steam-combustion gases mixture 292. The combustion chamber 202 then operably directs the second steam-combustion gases mixture 292 to exit the combustion chamber 202 through the combustion chamber outlet 211, and the second steam-combustion gases mixtures 292 is channeled downstream to the first stage turbine nozzle of the HP turbine 28 (FIG. 1).

The combustor 200 is an axially staged combustor. In particular, the plurality of second mixing assemblies 220 provides for axial fuel staging in the second combustion zone 202b. For example, the TVC 230 operably directs the combustion gases 66 from the TVC 230 into the combustion chamber 202 axially downstream of the first combustion zone 202a. Such a configuration of the combustor 200 provides for rich combustion provided by the plurality of first mixing assemblies 212 (e.g., by the first mixer 214), and lean combustion provided by the plurality of second mixing assemblies 220 to reduce $NO_x$ emissions as compared to combustors without the benefit of the present disclosure.

The steam system 90 (FIG. 1) can vary the steam injection into the TVC 230 during various operating conditions of a mission cycle of the turbine engine 10 (FIG. 1). The mission cycle includes, for example, a low-power operation, a mid-level power operation, and a high-power operation. Low-power operation includes, for example, engine start, idle, taxiing, and approach. Mid-level power operation includes, for example, cruise. High-power operation includes, for example, takeoff and climb. During engine start conditions or idle conditions, the steam injector 244 does not inject the steam 69 into the TVC 230. During operating conditions that are above idle conditions (e.g., taxiing and approach), during mid-power conditions, and during high-power conditions, the steam injector 244 operably injects the steam 69. During high-power conditions, the steam injector 244 operably injects a greater amount of the steam 69 than during the mid-power conditions.

The TVC 230 provides for flame stability, and the steam 69 in the TVC 230 reduces a temperature of the combustion gases 66 in the TVC 230. In this way, the second flame operates at a higher temperature and the steam 69 reduces the temperature of the second flame. The second vortex 249 provides residence time for the steam injection stream 280 to mix with the combustion gases 66 in the TVC 230. The TVC 230 enables a water-to-air ratio (WAR) up to sixty percent (60%) of the steam 69 to the compressed air 65 within the combustion chamber 202. For example, the WAR is 0.0% to 60%, and is preferably 5% to 60%. In some embodiments, the WAR is zero percent to sixty percent (0% to 60%) based on the operating conditions of the turbine engine (e.g., startup, idle, taxi, takeoff, climb, cruise, descent) or of the combustor 200. For example, the WAR in the combustor 200 is zero percent to thirty percent (0% to 30%) during low-power conditions, is one percent to forty percent (1% to 40%) during mid-power conditions, and is two percent to sixty percent (2% to 60%) during high-power conditions. In this way, the steam 69 is injected into the combustor 200 during any operating condition of the turbine engine 10 (FIG. 1) that is above an idle condition. Accordingly, the steam 69 injected into the TVC 230 enables reduced emissions ($NO_x$ emissions, nvPM emissions, CO emissions, noise) and reduced specific fuel capacity (SFC) while avoiding flameout of the first flame within the first combustion zone 202a, as compared to turbine engines without the benefit of the present disclosure.

Figure 3:
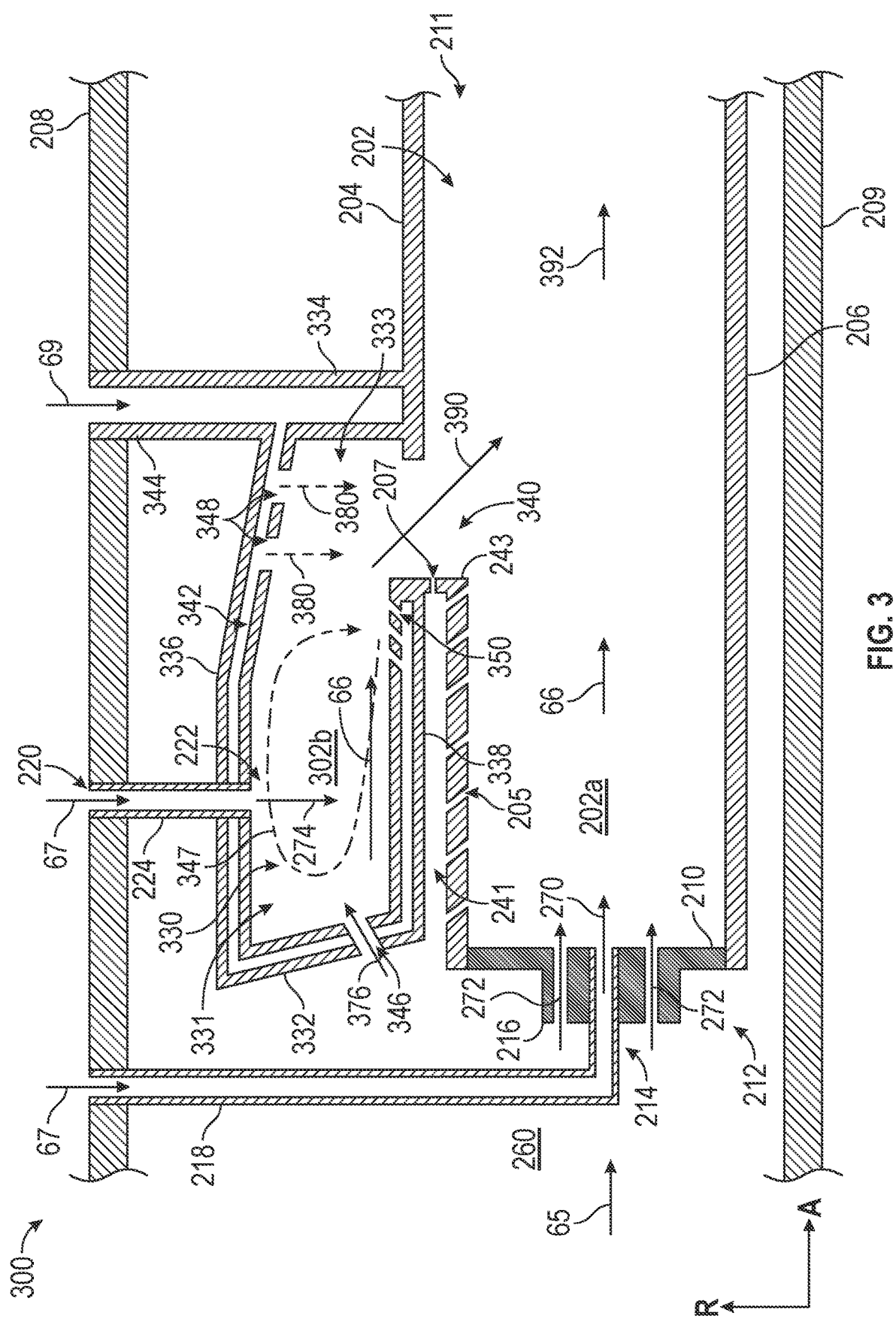
FIG. 3 is a schematic cross-sectional diagram of a combustor for a turbine engine, taken along a longitudinal centerline axis of the turbine engine, according to another embodiment.

FIG. 3 is a schematic cross-sectional diagram of a combustor 300 for a turbine engine, taken along a longitudinal centerline axis of the turbine engine, according to another embodiment. The combustor 300 is substantially similar to the combustor 200 of FIG. 2. The same reference numerals will be used for components of the combustor 300 that are the same as or similar to the components of the combustor 200 discussed above. The description of these components above also applies to this embodiment, and a detailed description of these components is omitted here. The combustor 300 includes a TVC 330 that is different than the TVC 230 of FIG. 2.

The TVC 330 is defined by one or more walls (collectively referred to as the walls of the TVC 330). For example, the TVC 330 is defined by a first wall 332, a second wall 334, a third wall 336, and a fourth wall 338. The TVC 330 does not include a partition wall, but includes an upstream portion 331 and a downstream portion 333 that is downstream of the upstream portion 331. The TVC 330 defines a second combustion zone 302b within the upstream portion 331 of the TVC 330. The upstream portion 331 is sized to contain the second combustion zone 302b such that a vortex 347 of compressed air 65 is formed within the upstream portion 331 and combustion occurs in the upstream portion 331, as detailed further below. The downstream portion 333 is sized to receive the steam 69. For example, the upstream portion 331 is defined axially aftward from the first wall 332 to approximately 50% of a total axial length of the TVC 330. The third wall 336 extends generally axially from the first wall 332 to the second wall 334. The third wall 336 angles radially inward at the downstream portion 333 of the TVC 330 such that a volume of the downstream portion 333 is less than a volume of the upstream portion 331. In this way, a radial height of the downstream portion 333 of the TVC 330 decreases from a forward end to an aft end of the downstream portion 333. The first wall 332 extends from the fourth wall 338 to the third wall 336 and is angled from the fourth wall 338 such that an angle between the first wall 332 and the fourth wall 338 is greater than ninety degrees (90°). In some embodiments, the angle between the first wall 332 and the fourth wall 338 is ninety degrees (90°) or is less than ninety degrees (90°). The fourth wall 338 extends axially from the first wall 332 to a TVC opening 340 that is defined between the fourth wall 338 and the outer liner 204.

At least one of the walls that defines the TVC 330 includes a steam path 342 defined therein. For example, the first wall 332, the second wall 334, the third wall 336, and the fourth wall 338 each includes a portion of the steam path 342 such that the steam path 342 is disposed within the first wall 332, the second wall 334, the third wall 336, and the fourth wall 338. A steam system (e.g., the steam system 90 of FIG. 1) includes a steam injector 344 in fluid communication with the steam path 342 for supplying the steam 69 to the steam path 342, as detailed above with respect to FIG. 2.

The TVC 330 includes one or more TVC air holes 346 defined through the first wall 332. The one or more TVC air holes 346 operably direct the compressed air 65 through the first wall 332 into the TVC 330 and generate the vortex 347. The TVC 330 also includes one or more steam injection holes 348 defined through the third wall 336 and one or more steam cooling holes 350. The one or more steam injection holes 348 provide fluid communication between the steam path 342 and the TVC 330. The one or more steam injection holes 348 are positioned through the third wall 336 at the downstream portion 333 of the TVC 330 and are located radially outward and generally axially aligned with the TVC opening 340. The one or more steam injection holes 348 operably direct the steam 69 from the steam path 342 through the third wall 336 into the TVC 330. For example, one or more steam injection holes 348 operably direct the steam 69 generally radially into the downstream portion 333 of the TVC 330.

The TVC 330 includes one or more steam cooling holes 350 disposed through one or more of the walls of the TVC 330. For example, the one or more steam cooling holes 350 are disposed through the fourth wall 338 at the downstream portion 333 of the TVC 330. The one or more steam cooling holes 350 operably direct the steam 69 from the steam path 342 therethrough to cool the fourth wall 338.

The TVC 330 operates substantially similarly as the TVC 230 of FIG. 2. A second compressed air stream 376 is injected through the one or more TVC air holes 346 into the upstream portion 331 of the TVC 330. The one or more TVC air holes 346 are angled due to the angled first wall 332 such the one or more TVC air holes 346 operably direct the second compressed air stream 376 at an angle greater than zero degrees (0°) and less than ninety degrees (90°) with respect to the axial direction A. In some embodiments, the TVC air holes 246 are angled to direct the second compressed air stream 376 at an angle equal to ninety degrees (90°) or greater than ninety degrees (90°) with respect to the axial direction A. The second compressed air stream 376 mixes with the second fuel stream 274 to generate the second fuel-air mixture and the second fuel-air mixture is ignited to generate the second flame, as detailed above with respect to FIG. 2. The second flame burns within the upstream portion 331 (e.g., within the second combustion zone 302b) of the TVC 330 to produce the combustion gases 66. The TVC 330 operably directs the combustion gases 66 from the upstream portion 331 to the downstream portion 333 of the TVC 330. At the downstream portion 333, the one or more steam injection holes 348 operably direct the steam 69 therethrough to generate a steam injection stream 380. The steam injection stream 380 mixes with the combustion gases 66 within the downstream portion 333 to generate a first steam-combustion gases mixture 390. The TVC 330 operably directs the first steam-combustion gases mixture 390 through the TVC opening 340 and into the combustion chamber 202 downstream of the first combustion zone 202a. The combustion gases 66 from the first combustion zone 202a mix with the first steam-combustion gases mixture 390 within the combustion chamber 202 to generate a second steam-combustion gases mixture 392. The second steam-combustion gases mixture 392 is then channeled downstream to the first stage turbine nozzle of the HP turbine (e.g., the HP turbine 28 of FIG. 1).

Figure 4:
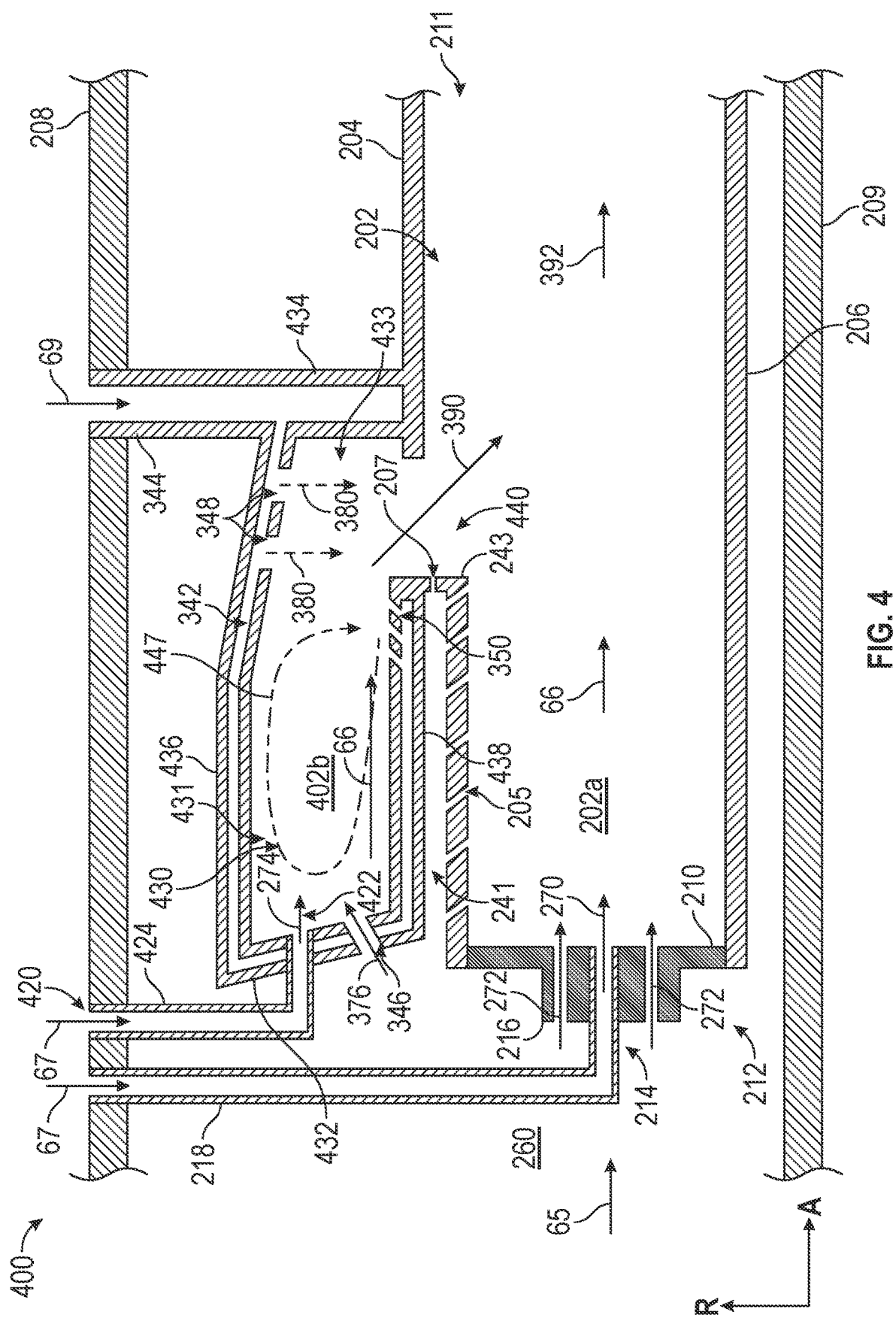
FIG. 4 is a schematic cross-sectional diagram of a combustor for a turbine engine, taken along a longitudinal centerline axis of the turbine engine, according to another embodiment.

FIG. 4 is a schematic cross-sectional diagram of a combustor 400 for a turbine engine, taken along a longitudinal centerline axis of the turbine engine, according to another embodiment. The combustor 400 is substantially similar to the combustors 200, 300 of FIGS. 2 and 3, respectively. The same reference numerals will be used for components of the combustor 400 that are the same as or similar to the components of the combustors 200, 300 discussed above. The description of these components above also applies to this embodiment, and a detailed description of these components is omitted here. The combustor 400 includes a plurality of second mixing assemblies 420 and a TVC 430 that are different than the plurality of second mixing assemblies 220 and the TVC 330 of FIGS. 2 and 3, respectively.

Each of the plurality of second mixing assemblies 420 includes a second mixer 422 and a second fuel injector 424. The TVC 430 is defined by one or more walls (collectively referred to as the walls of the TVC 430). For example, the TVC 430 is defined by a first wall 432, a second wall 434, a third wall 436, and a fourth wall 438. The walls of the TVC 430 are substantially similar to the walls of the TVC 330 of FIG. 3, and the TVC 430 similarly includes a second combustion zone 402b, an upstream portion 431, a downstream portion 433, and a TVC opening 440. A vortex 447 is formed in the upstream portion 431, similar to the vortex 347 of FIG. 3. The combustor 400 operates substantially similarly as to the combustor 300 of FIG. 3. The plurality of second mixing assemblies 420 is disposed through the first wall 432 such that the second fuel injector 424 injects the fuel 67 axially forward into the upstream portion 431 of the TVC 430.

Figure 5:
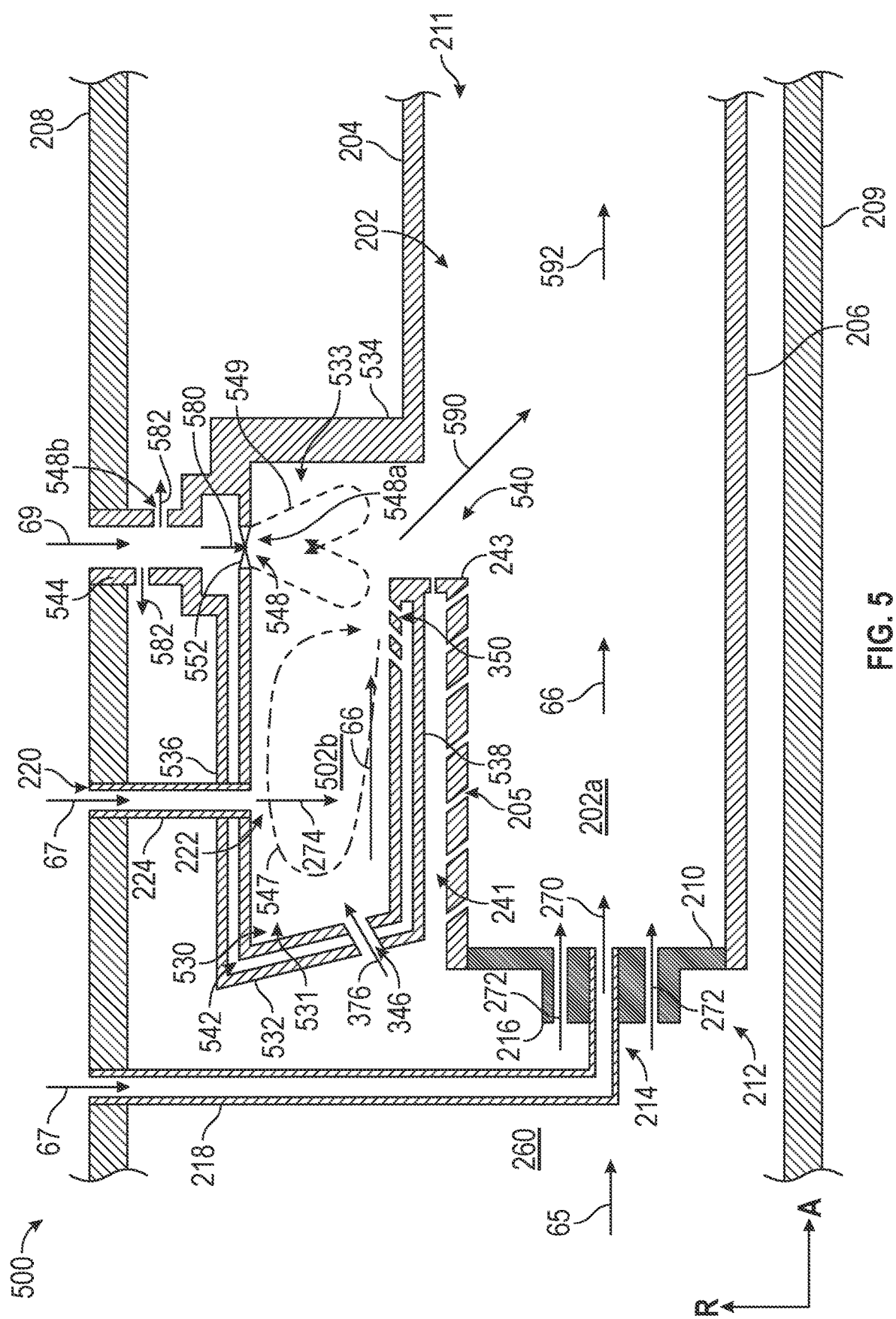
FIG. 5 is a schematic cross-sectional diagram of a combustor for a turbine engine, taken along a longitudinal centerline axis of the turbine engine, according to another embodiment.

FIG. 5 is a schematic cross-sectional diagram of a combustor 500 for a turbine engine, taken along a longitudinal centerline axis of the turbine engine, according to another embodiment. The combustor 500 is substantially similar to the combustors 200, 300 of FIGS. 2 and 3, respectively. The same reference numerals will be used for components of the combustor 500 that are the same as or similar to the components of the combustors 200, 300 discussed above. The description of these components above also applies to this embodiment, and a detailed description of these components is omitted here. The combustor 500 includes a TVC 530 and a steam injector 544 that are different than the TVC 330 and the steam injector 344 of FIG. 3.

The TVC 530 is defined by one or more walls (collectively referred to as the walls of the TVC 530). For example, the TVC 530 is defined by a first wall 532, a second wall 534, a third wall 536, and a fourth wall 538. The walls of the TVC 530 are substantially similar to the walls of the TVC 330 of FIG. 3, and the TVC 530 similarly includes a second combustion zone 502b, an upstream portion 531, a downstream portion 533, and a TVC opening 540. The upstream portion 531 is sized to contain the second combustion zone 502b such that a vortex 547 of compressed air 65 is formed within the upstream portion 531 and combustion occurs within the upstream portion 531. The downstream portion 533 is sized to receive the steam 69. For example, the upstream portion 531 is defined axially aftward from the first wall 532 to approximately 75% of a total axial length of the TVC 530. The third wall 536 extends substantially axially from the first wall 532 to the second wall 534, and does not angle radially inward at the downstream portion 533 of the TVC 530. In this way, a radial height of the downstream portion 533 remains constant and does not decrease from a forward end to an aft end of the downstream portion 533. At least one of the walls that define the TVC 530 also includes a steam path 542 defined therein for receiving the steam 69. The steam path 542 extends through the first wall 532, the third wall 536, and the fourth wall 538. The steam path 542, however, does not extend through the second wall 534. In some embodiments, the steam path 542 can extend through the second wall 534, similar to the embodiments of FIGS. 2 to 4.

The steam injector 544 is disposed through the third wall 536 and provides fluid communication from a steam system (e.g., the steam system 90 of FIG. 1) to the steam path 542 via a steam line (not shown in FIG. 5). The steam injector 544 includes one or more steam injection holes 548 disposed through the steam injector 544. The one or more steam injection holes 548 include one or more first steam injection holes 548a and one or more second steam injection holes 548b. The one or more first steam injection holes 548a are positioned to operably direct the steam 69 into the downstream portion 533 of the TVC 530. The one or more second steam injection holes 548b are positioned on the steam injector 544 to inject the steam 69 outside of the TVC 530 and outside of the combustion chamber 202.

The steam injector 544 also includes a steam swirler 552 for swirling the steam 69 therethrough to generate a steam swirl 549. In operation, the steam injector 544 operably directs the steam 69 through the one or more first steam injection holes 548a and into the downstream portion 533 of the TVC 530 to generate a first steam injection stream 580. The steam swirler 552 swirls the first steam injection stream 580 to generate the steam swirl 549. The steam swirl 549 facilitates mixing of the combustion gases 66 from the upstream portion 531 (e.g., the second combustion zone 502b) of the TVC 530 with the first steam injection stream 580 in the downstream portion 533 of the TVC 530. The combustion gases 66 from the upstream portion 531 mix with the first steam injection stream 580 to generate a first steam-combustion gases mixture 590 within the downstream portion 533. The TVC 530 operably directs the first steam-combustion gases mixture 590 through the TVC opening 540 and into the combustion chamber 202. The first steam-combustion gases mixture 590 mixes with the combustion gases 66 from the first combustion zone 202a within the combustion chamber 202 to generate a second steam-combustion gases mixture 592 that is then channeled downstream to the first stage turbine nozzle of the HP turbine (e.g., the HP turbine 28 of FIG. 1).

The steam injector 544 also operably directs the steam 69 through the one or more second steam injection holes 548b to generate a second steam injection stream 582 outside of the TVC 530 and outside of the combustion chamber 202. The combustor 500 operably directs the second steam injection stream 582 to at least one of the outer liner 204, the inner liner 206, or the annular dome 210 for cooling the outer liner 204, the inner liner 206, or the annular dome 210, respectively. In some embodiments, the combustor 500 operably directs the second steam injection stream 582 to the high-pressure turbine (e.g., the high-pressure turbine 28 of FIG. 1) to provide cooling for the high-pressure turbine.

Figure 6:
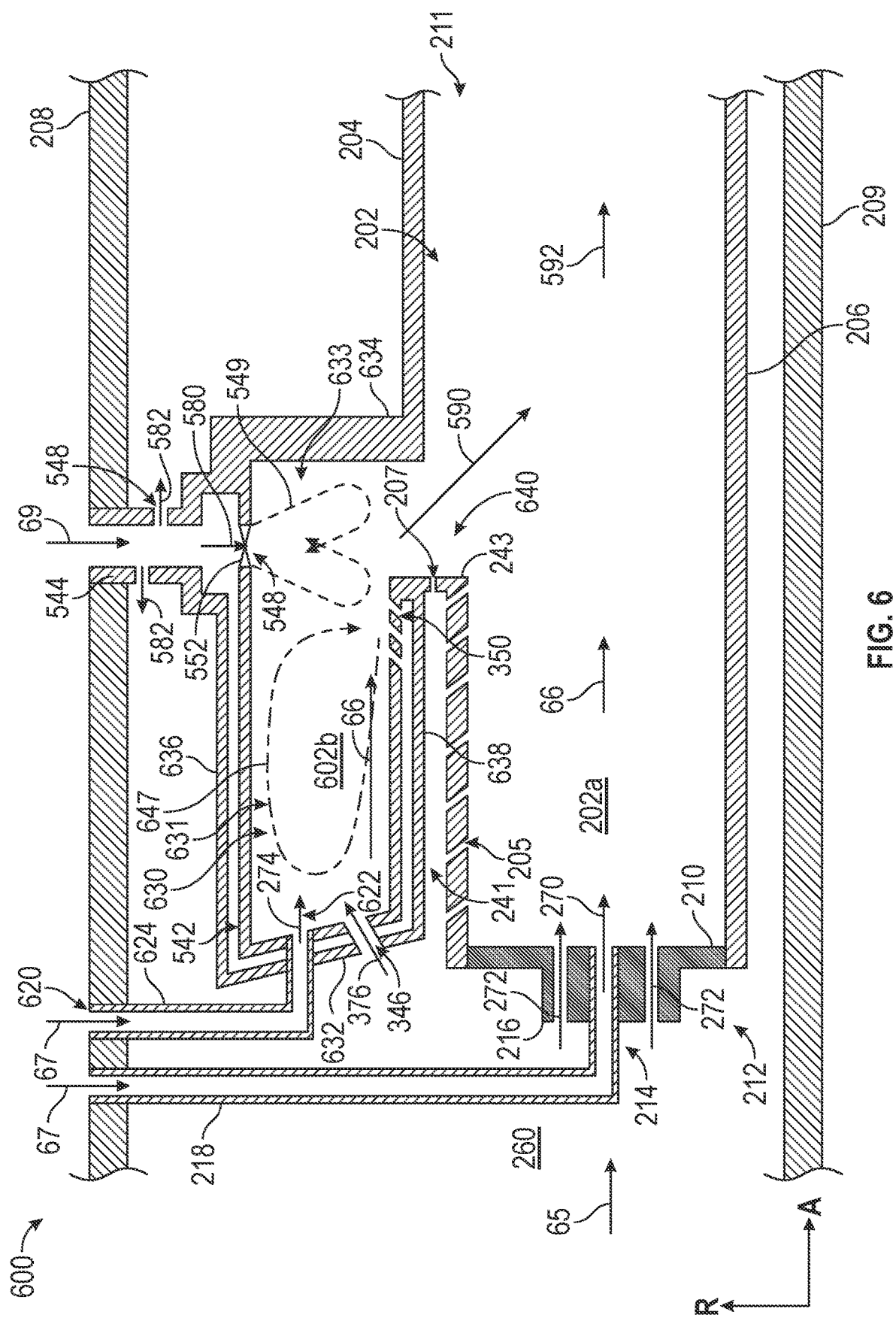
FIG. 6 is a schematic cross-sectional diagram of a combustor for a turbine engine, taken along a longitudinal centerline axis of the turbine engine, according to another embodiment.

FIG. 6 is a schematic cross-sectional diagram of a combustor 600 for a turbine engine, taken along a longitudinal centerline axis of the turbine engine, according to another embodiment. The combustor 600 is substantially similar to the combustors 200, 300, 500 of FIGS. 2, 3, and 5. The same reference numerals will be used for components of the combustor 600 that are the same as or similar to the components of the combustors 200, 300, 300, 500 discussed above. The description of these components above also applies to this embodiment, and a detailed description of these components is omitted here. The combustor 500 includes a plurality of second mixing assemblies 620 and a TVC 630 that are different than the plurality of second mixing assemblies 220 and the TVCs 230, 330, 530 of FIGS. 2, 3, and 5, respectively.

Each of the plurality of second mixing assemblies 620 includes a second mixer 622 and a second fuel injector 624. The TVC 630 is defined by one or more walls (collectively referred to as the walls of the TVC 630). For example, the TVC 630 is defined by a first wall 632, a second wall 634, a third wall 636, and a fourth wall 638. The walls of the TVC 630 are substantially similar to the walls of the TVC 530 of FIG. 5, and the TVC 630 similarly includes a second combustion zone 602b, an upstream portion 631, a downstream portion 633, and a TVC opening 640. The combustor 600 operates substantially similarly to the combustor 500 of FIG. 5. The plurality of second mixing assemblies 620, however, is disposed through the first wall 632 such that the second fuel injector 624 injects the fuel 67 axially forward into the upstream portion 631 of the TVC 630 to generate the second fuel stream 274 that mixes with the second compressed air stream 376 at a vortex 647.

Figure 7:
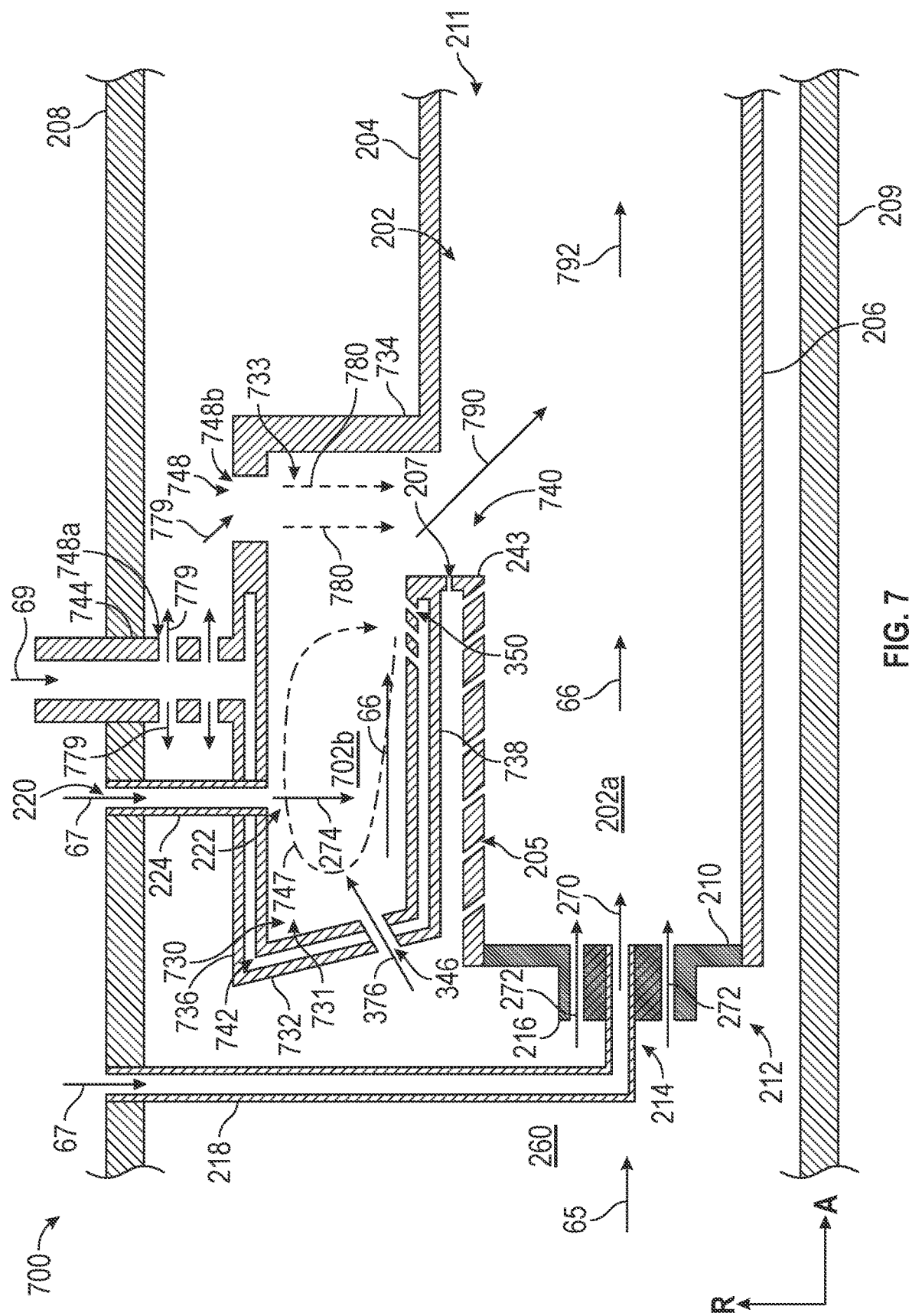
FIG. 7 is a schematic cross-sectional diagram of a combustor for a turbine engine, taken along a longitudinal centerline axis of the turbine engine, according to another embodiment.

FIG. 7 is a schematic cross-sectional diagram of a combustor 700 for a turbine engine, taken along a longitudinal centerline axis of the turbine engine, according to another embodiment. The combustor 700 is substantially similar to the combustors 200, 300, 500 of FIGS. 2, 3, and 5. The same reference numerals will be used for components of the combustor 700 that are the same as or similar to the components of the combustors 200, 300, 500 discussed above. The description of these components above also applies to this embodiment, and a detailed description of these components is omitted here. The combustor 700 includes a TVC 730 and a steam injector 744 that are different than the TVCs 230, 330, 530 and the steam injector 244, 344, 544 of FIGS. 2, 3, and 5, respectively.

The TVC 730 is defined by one or more walls (collectively referred to as the walls of the TVC 730). For example, the TVC 730 is defined by a first wall 732, a second wall 734, a third wall 736, and a fourth wall 738. The walls of the TVC 730 are substantially similar to the walls of the TVC 530 of FIG. 5, and the TVC 730 similarly includes a second combustion zone 702*b*, an upstream portion 731, a downstream portion 733, and a TVC opening 740. A vortex 747 is formed in the upstream portion 731 to mix the second compressed air stream 376 and the second fuel stream 274. At least one of the walls that define the TVC 730 also include a steam path 742 defined therein for receiving the steam 69. The steam path 742 extends through the first wall 732, the third wall 736, and the fourth wall 738. The steam path 742, however, does not extend through the second wall 734. The steam path 742 extends only a portion of the third wall 736 such that the steam path 742 does not extend an entire length of the third wall 736. The steam path 742, however, can extend the entire length of the third wall 736 or can extend through the second wall 734 as well.

A steam system (e.g., the steam system 90 of FIG. 1) includes the steam injector 744 and one or more steam injection holes 748 disposed in at least one of the walls of the TVC 730. The one or more steam injection holes 748 include one or more first steam injection holes 748*a* and one or more second steam injection holes 748*b*. The one or more first steam injection holes 748*a* are disposed through the steam injector 744 and are positioned on the steam injector 744 to inject the steam 69 outside of the TVC 730 and outside of the combustion chamber 202. The one or more second steam injection holes 748*b* are disposed through the third wall 736 and are positioned on the third wall 736 to operably direct a first steam injection stream 779 into the downstream portion 733 of the TVC 730 (e.g., downstream of the second combustion zone 702*b*).

In operation, the steam injector 744 operably directs the steam 69 through the one or more first steam injection holes 748*a* and outside of the TVC 730 and outside of the combustion chamber 202 to generate the first steam injection stream 779. The first steam injection stream 779 mixes with the compressed air 65. The combustor 700 operably directs a portion of the first steam injection stream 779 and a portion of the compressed air 65 through the one or more second steam injection holes 748*b* and into the downstream portion 733 of the TVC 730 to generate a second steam injection stream 780. The compressed air 65 in the second steam injection stream 780 helps to burn any unburnt fuel from the first combustion zone 202*a* and from the second combustion zone 202*b*. The combustion gases 66 from the upstream portion 731 mix with the second steam injection stream 780 to generate a first steam-combustion gases mixture 790. The TVC 730 operably directs the first steam-combustion gases mixture 790 through the TVC opening 740 and into the combustion chamber 202. The first steam-combustion gases mixture 790 mixes with the combustion gases 66 from the first combustion zone 202*a* within the combustion chamber 202 to generate a second steam-combustion gases mixture 792 that is then channeled downstream to the first stage turbine nozzle of the HP turbine (e.g., the HP turbine 28 of FIG. 1). The combustor 700 also operably directs a portion of the first steam injection stream 779 to at least one of the outer liner 204, the inner liner 206, or the annular dome 210 for cooling the outer liner 204, the inner liner 206, or the annular dome 210, respectively.

Figure 8:
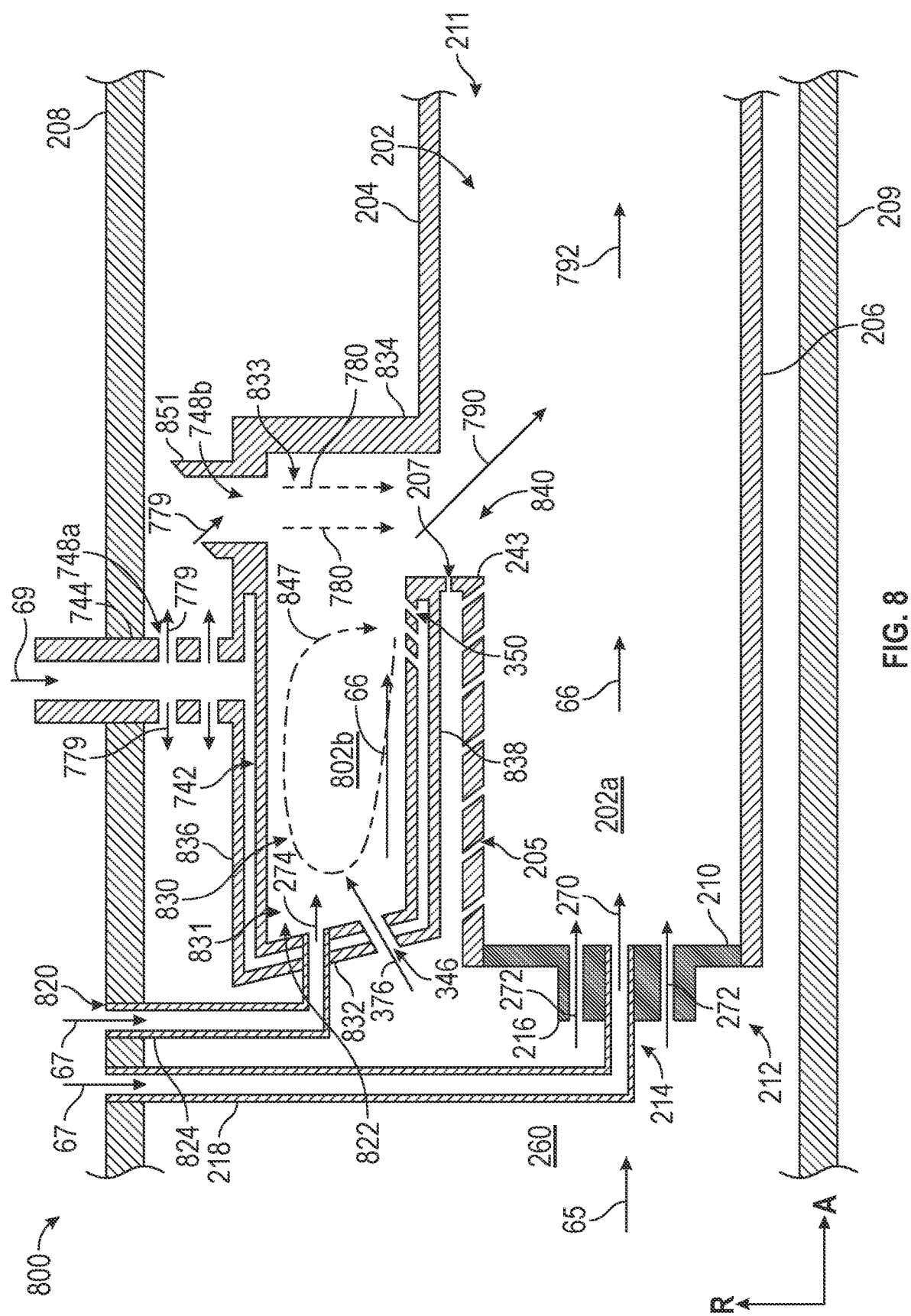
FIG. 8 is a schematic cross-sectional diagram of a combustor for a turbine engine, taken along a longitudinal centerline axis of the turbine engine, according to another embodiment.

FIG. 8 is a schematic cross-sectional diagram of a combustor 800 for a turbine engine, taken along a longitudinal centerline axis of the turbine engine, according to another embodiment. The combustor 800 is substantially similar to the combustors 200, 300, 700 of FIGS. 2, 3, and 7. The same reference numerals will be used for components of the combustor 700 that are the same as or similar to the components of the combustors 200, 300, 700 discussed above. The description of these components above also applies to this embodiment, and a detailed description of these components is omitted here. The combustor 800 includes a plurality of second mixing assemblies 820 and a TVC 830 that are different than the plurality of second mixing assemblies 220 and the TVCs 230, 330, 730 of FIGS. 2, 3, and 7, respectively.

Each of the plurality of second mixing assemblies 820 includes a second mixer 822 and a second fuel injector 824. The TVC 830 is defined by one or more walls (collectively referred to as the walls of the TVC 830). For example, the TVC 830 is defined by a first wall 832, a second wall 834, a third wall 836, and a fourth wall 838. The walls of the TVC 830 are substantially similar to the walls of the TVC 730 of FIG. 7, and the TVC 830 similarly includes a combustion zone 802*b*, an upstream portion 831, a downstream portion 833, and a TVC opening 840. The combustor 800 operates substantially similarly to the combustor 700 of FIG. 7. The plurality of second mixing assemblies 820, however, is disposed through the first wall 832 such that the second fuel injector 824 injects the fuel 67 axially forward into the upstream portion 831 of the TVC 830 to generate the second fuel stream 274 that mixes with the second compressed air stream 376 at a vortex 847.

In FIG. 8, the one or more second steam injection holes 748*b* also include a steam injection hole extension 851 disposed about the one or more second steam injection holes 748*b*. The steam injection hole extension 851 extends generally radially from the third wall 836. For example, the steam injection hole extension 851 extends radially outward from the third wall 836. In this way, the steam injection hole extension 851 is disposed outside of the TVC 830. In operation, the steam injection hole extension 851 operably directs the first steam injection stream 779 into the one or more second steam injection holes 748*b*, and subsequently into the TVC 830. In this way, the steam injection hole extension 851 helps to guide the first steam injection stream 779 into the one or more second steam injection holes 748*b*, and helps the first steam injection stream 779 penetrate into the combustion gases 66 within the TVC 830.

Figure 9:
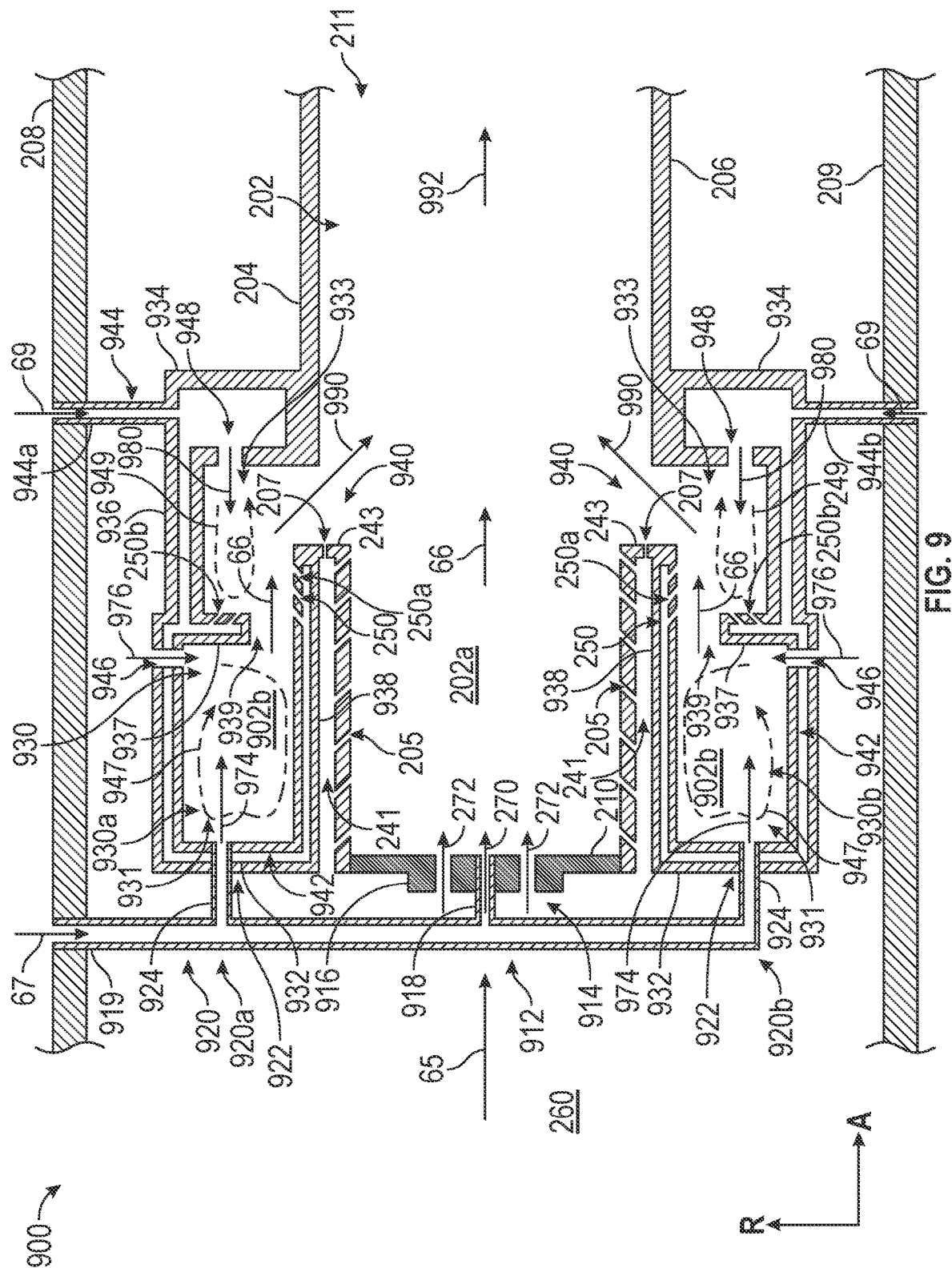
FIG. 9 is a schematic cross-sectional diagram of a combustor for a turbine engine, taken along a longitudinal centerline axis of the turbine engine, according to another embodiment.

FIG. 9 is a schematic cross-sectional diagram of a combustor 900 for a turbine engine, taken along a longitudinal centerline axis of the turbine engine, according to another embodiment. The combustor 900 is substantially similar to the combustor 200 of FIG. 2. The same reference numerals will be used for components of the combustor 900 that are the same as or similar to the components of the combustor 200 discussed above. The description of these components above also applies to this embodiment, and a detailed description of these components is omitted here. The combustor 900 includes a plurality of first mixing assemblies 912, a plurality second mixing assemblies 920, a plurality of trapped vortex cavities (TVCs) 930, and a plurality of steam injectors 944 that are different than the plurality of first mixing assemblies 212, the plurality second mixing assemblies 220, the TVC 230, and the steam injector 244 of FIG. 2, respectively. The plurality of TVCs 930 includes a first TVC 930*a* that extends from the outer liner 204 and a second TVC 930*b* that extends from the inner liner 206.

Each of the plurality of first mixing assemblies 912 includes a first mixer 914 and a first mixing assembly swirler 916. A plurality of first fuel injectors 918 (only one is illustrated in FIG. 9) is coupled in flow communication with each respective first mixing assembly 912. The plurality of first fuel injectors 918 is coupled to a fuel injector line 919 that is in flow communication with a fuel system (e.g., the fuel system 80 of FIG. 1) for supplying the fuel 67 to the plurality of first fuel injectors 918.

Each of the plurality of second mixing assemblies 920 includes a second mixer 922. A plurality of second fuel injectors 924 (only one shown in FIG. 9) is coupled in flow communication with each respective second mixing assembly 920. The plurality of second mixing assemblies 920 are in fluid communication with the fuel injector line 919. The plurality of second mixing assemblies 920 includes a first plurality of second mixing assemblies 920a in fluid communication with the first TVC 930a and a second plurality of second mixing assemblies 920b in fluid communication with the second TVC 930b. In this way, the first plurality of second mixing assemblies 920a provides the compressed air 65 and the fuel 67 to the first TVC 930a, and the second plurality of second mixing assemblies 920b provides the compressed air 65 and the fuel 67 to the second TVC 930b, as detailed further below.

Each of the plurality of TVCs 930 is defined by one or more walls (collectively referred to as the walls of each TVC 930). For example, each TVC 930 is defined by a first wall 932, a second wall 934, a third wall 936, a fourth wall 938, and a partition wall 937. In this way, each of the plurality of TVCs 930 is substantially similar to the TVC 230 of FIG. 2. Each of the plurality of TVCs 930 also includes a second combustion zone 902b, an upstream portion 931, a downstream portion 933 downstream of the upstream portion 931, and a TVC opening 940. The partition wall 937 is spaced from the fourth wall 938 to define a radial gap 939 therebetween. At least one of the walls that defines each of the plurality of TVCs 930 includes a steam path 942 defined therein.

A steam system (e.g., the steam system 90 of FIG. 1) includes the plurality of steam injectors 944 and one or more steam injection holes 948. The plurality of steam injectors 944 includes a first steam injector 944a disposed through the third wall 936 of the first TVC 930a, and a second steam injector 944b disposed through the third wall 936 of the second TVC 930b. The one or more steam injection holes 948 are disposed through second wall 934 of each respective TVC 930 for injecting the steam 69 from the steam path 942 into each respective TVC 930.

Each of the plurality of TVCs 930 includes one or more TVC air holes 946 defined through the third wall 936. The one or more TVC air holes 946 operably direct the compressed air 65 radially through the third wall 936 into each of the plurality of TVCs 930 to generate a first vortex 947 within the upstream portion 931. The plurality of second fuel injectors 924 is disposed through the first wall 932 to inject the fuel 67 axially through the first wall 932.

The combustor 900 operates substantially similarly as to the combustor 200 of FIG. 2. The plurality of second fuel injectors 924 injects the fuel 67 into the upstream portion 931 to generate a second fuel stream 974. The one or more TVC air holes 946 operably direct a second compressed air stream 976 therethrough into the upstream portion 931 of the TVC 930. The fuel 67 mixes with the second compressed air stream 976 by the first vortex 947 to generate a fuel-air mixture that is ignited to generate the combustion gases 66. The combustion gases 66 pass from the upstream portion 931, through the radial gap 939, and into the downstream portion 933. The plurality of steam injectors 944 operably injects the steam 69 through the one or more steam injection holes 948 and into the respective TVC 930 to generate a steam injection stream 980 that generates a second vortex 949. The combustion gases 66 mix with the steam injection stream 980 by the second vortex 949 within the downstream portion 933 to generate a first steam-combustion gases mixture 990. The first steam-combustion gases mixture 990 is directed through the TVC opening 940 and into the combustion chamber 202 downstream of the first combustion zone 202a. In the combustion chamber 202, the first steam-combustion gases mixture 990 mixes with the combustion gases 66 from the first combustion zone 202a to generate a second steam-combustion gases mixture 992. The second steam-combustion gases mixture 992 is then channeled downstream to the first stage turbine nozzle of the HP turbine (e.g., the HP turbine 28 of FIG. 1).

Figure 10:
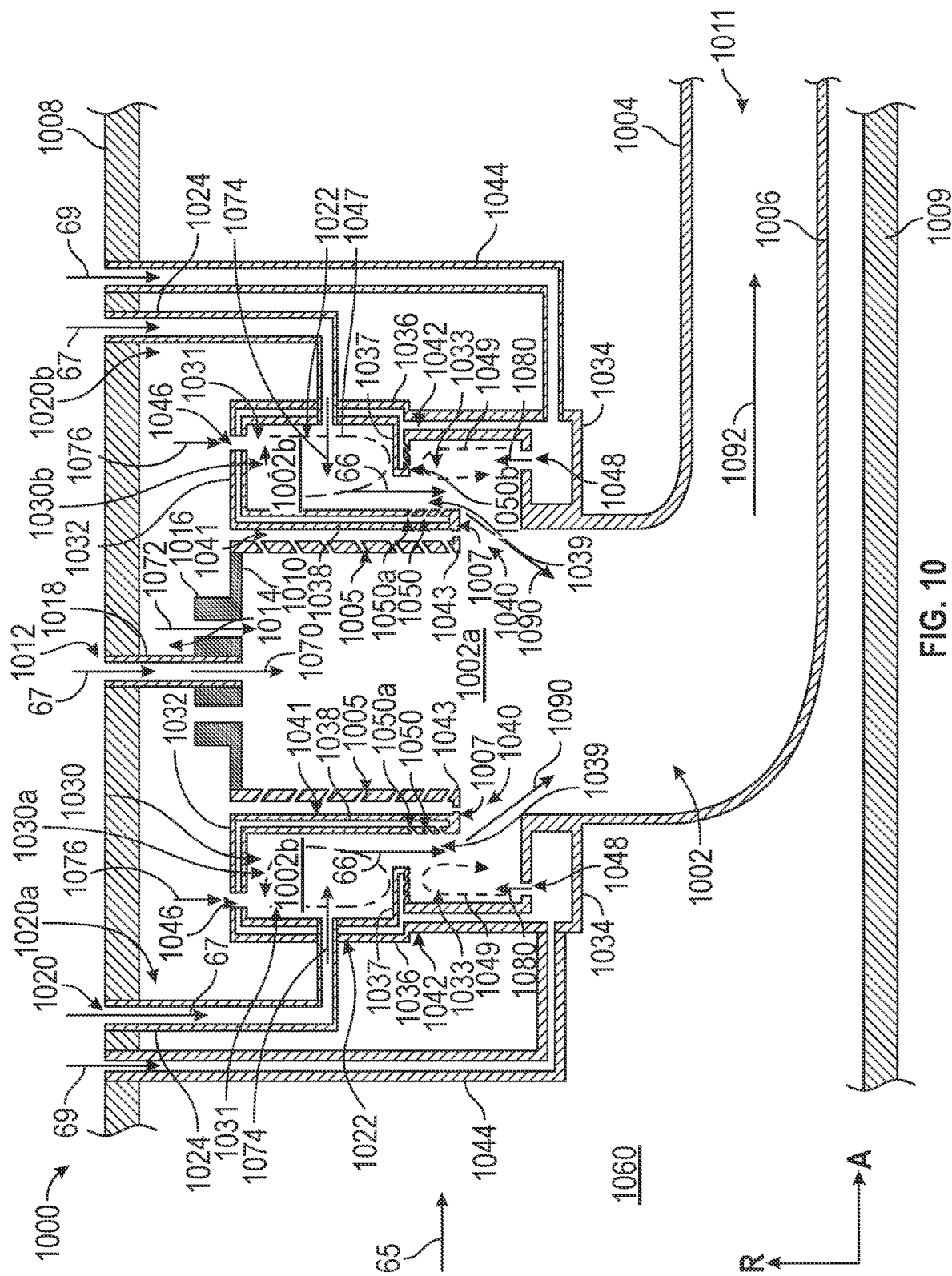
FIG. 10 is a schematic cross-sectional diagram of a combustor for a turbine engine, taken along a longitudinal centerline axis of the turbine engine, according to another embodiment.

FIG. 10 is a schematic cross-sectional diagram of a combustor 1000 for a turbine engine, taken along a longitudinal centerline axis of the turbine engine, according to another embodiment. The combustor 1000 can be utilized in the combustion section 26 in the turbine engine 10 of FIG. 1. The combustor 1000, however, is a radial combustor in which the first fuel-air mixture is injected radially, as detailed further below.

The combustor 1000 includes a combustion chamber 1002 defined by an outer liner 1004 and an inner liner 1006. The outer liner 1004 and the inner liner 1006 are annular about the longitudinal centerline axis 12 of the turbine engine 10 (FIG. 1). The outer liner 204 defines a radially outer boundary of the combustion chamber 1002, and the inner liner 1006 defines a radially inner boundary of the combustion chamber 202. The outer liner 1004 and the inner liner 1006 are spaced radially inward from an outer combustor casing 1008 and an inner combustor casing 1009, respectively, that extend circumferentially about the outer liner 1004 and the inner liner 1006. The outer liner 1004 and the inner liner 1006 include one or more liner air holes 1005 that operably direct the compressed air 65 through the outer liner 1004 and through the inner liner 1006 and into the combustion chamber 1002 to cool the outer liner 1004 and the inner liner 1006 (e.g., by film cooling). The combustor 1000 also includes an annular dome 1010 upstream from and coupled to the outer liner 1004 and the inner liner 1006. The annular dome 1010 defines an upstream end of the combustion chamber 1002.

The combustion chamber 1002 extends from the annular dome 1010 to a combustion chamber outlet 1011. In particular, annular dome 1010 extends axially, and the outer liner 204 and the inner liner 206 extend radially inward from the annular dome 1010 and define the first combustion zone 1002a therebetween. The outer liner 1004 and the inner liner 1006 curve downstream of the first combustion zone 1002a and then extend axially to the combustion chamber outlet 1011.

A plurality of first mixing assemblies 1012 (only one is illustrated in FIG. 10) is spaced circumferentially about the annular dome 1010 to deliver a first mixture of fuel and air to the combustion chamber 1002. For example, each of the plurality of first mixing assemblies 1012 delivers the first mixture of fuel and air into a first combustion zone 1002a of the combustion chamber 1002, as detailed further below. Each first mixing assembly 1012 includes a first mixer 1014 and a first mixing assembly swirler 1016. A plurality of first fuel injectors 1018 (only one is illustrated in FIG. 10) is coupled in flow communication with each respective first mixing assembly 1012. The plurality of first fuel injectors 1018 is spaced circumferentially about the annular dome 1010 and extend radially from the outer combustor casing 1008 to the plurality of first mixing assemblies 1012.

A plurality of second mixing assemblies 1020 (only one is illustrated in FIG. 10) is spaced circumferentially about the outer liner 1004 to deliver a second mixture of fuel and air to a second combustion zone 1002*b*, as detailed further below. The second combustion zone 1002*b* is configured to eject combustion gases 66 from the second combustion zone 1002*b* axially aft of the first combustion zone 1002*a*, as detailed further below. Each of the plurality of second mixing assemblies 1020 includes a second mixer 1022. A plurality of second fuel injectors 1024 (only one is illustrated in FIG. 10) is coupled in flow communication with each respective second mixing assembly 1020. The plurality of second fuel injectors 1024 is spaced circumferentially about the outer liner 1004 and extend radially from the outer combustor casing 1008 to the plurality of second mixing assemblies 1020. The plurality of second mixing assemblies 1020 includes a first plurality of second mixing assemblies 1020*a* and a second plurality of second mixing assemblies 1020*b*.

The combustor 1000 includes a plurality of trapped vortex cavities (TVCs) 1030 formed in the outer liner 1004 and in the inner liner 1006 that defines the second combustion zone 202*b*. For example, the plurality of TVCs 1030 includes a first TVC 1030*a* that extends from the inner liner 1006 and a second TVC 1030*b* that extends from the outer liner 1004. Each of the plurality of TVCs 1030 is defined by a first wall 1032, a second wall 1034, a third wall 1036, a fourth wall 1038, a partition wall 1037 (collectively referred to as the walls of the plurality of TVCs 1030). The first wall 1032 and the second wall 1034 extend generally axially, and the third wall 1036 and the fourth wall 1038 extend generally radially. The first wall 1032 defines a first axial wall of each of the plurality of TVCs 1030, the second wall 1034 defines a second axial wall of each of the plurality of TVCs 1030, the third wall 1036 defines a first radial wall of each of the plurality of TVCs 1030, and the fourth wall 1038 defines a second radial wall of each of the plurality of TVCs 1030. The second wall 1034 is spaced radially inward of the first wall 1032. The first wall 1032 extends generally axially from a radially outer end of the third wall 1036 to a radially outer end of the fourth wall 1038. The second wall 1034 extends generally axially from the outer liner 1004 or the inner liner 1006 to a radially inner end of the third wall 1036. The third wall 1036 extends generally radially from the first wall 1032 to the second wall 1034. The fourth wall 1038 is spaced axially from the third wall 1036 and extends generally radially from the first wall 1032 to a TVC opening 1040 that is defined between a radially inner end of the fourth wall 1038 and radially outer surface of the outer liner 1004 or the inner liner 1006.

Each of the plurality of TVCs 1030 is defined between the first wall 1032, the second wall 1034, the third wall 1036, and the fourth wall 1038. In this way, the plurality of TVCs 1030 is located axially on either axial side of the first combustion zone 1002*a* of the combustion chamber 1002. The TVC opening 1040 is an opening in the outer liner 1004 or the inner liner 1006 to provide flow communication from the plurality of TVCs 1030 to the combustion chamber 1002. While the plurality of TVCs 1030 illustrated in FIG. 10 each includes a substantially rectangular cross section, the plurality of TVCs 1030 can include any shape.

The partition wall 1037 extends axially from the third wall 1036 into the respective TVC 1030. The partition wall 1037 radially divides each of the plurality of TVCs 1030 into an upstream portion 1031 and a downstream portion 1033 that is downstream of the upstream portion 1031. In this way, the downstream portion 1033 is radially inward of the upstream portion 1031. The partition wall 1037 extends only partially into each of the plurality of TVCs 1030 such that a gap 1041 is defined axially between the partition wall 1037 and the fourth wall 1038. In some embodiments, the partition wall 1037 extends axially from the fourth wall 1038 into each respective TVC 1030 to axially separate each respective TVC 1030 into the upstream portion 1031 and the downstream portion 1033. In such embodiments, the axial gap 1039 is defined between the partition wall 1037 and the third wall 1036. The upstream portion 1031 defines the second combustion zone 1002*b*, and the TVC opening 1040 is defined at the downstream portion 1033. In FIG. 10, the upstream portion 1031 is a primary TVC and the downstream portion is a secondary TVC, as detailed further below. A volume of the upstream portion 1031 is greater than a volume of the downstream portion 1033. In some embodiments, the volume of the upstream portion 1031 is substantially equal to or less than the volume of the downstream portion 1033.

The fourth wall 1038 is spaced axially from the outer liner 1004 or the inner liner 1006 such that a gap 1041 is defined between the fourth wall 1038, and the outer liner 1004 or the inner liner 1006. The fourth wall 1038 is coupled to the outer liner 1004 or the inner liner 1006 by a liner extension portion 1043 that extends from the outer liner 1004 or the inner liner 1006 to a radially inner end of the fourth wall 1038. The liner extension portion 1043 connects the fourth wall 1038, and the outer liner 1004 or the inner liner 1006. The liner extension portion 1043 includes one or more liner extension portion holes 1007 that extend generally radially through the liner extension portion 1043. The one or more liner extension portion holes 1007 operably direct the compressed air 65 through the liner extension portion 1043 and into the combustion chamber 1002 to cool the liner extension portion 1043.

At least one of the walls that defines each of the plurality of TVCs 1030 includes a steam path 1042 defined therein. For example, the first wall 1032, the second wall 1034, the third wall 1036, the fourth wall 1038, and the partition wall 1037 each includes a portion of the steam path 1042 such that the steam path 1042 is disposed within the first wall 1032, the second wall 1034, the third wall 1036, and the fourth wall 1038. A steam system (e.g., the steam system 90 of FIG. 1) includes a steam injector 1044 in fluid communication with the steam path 1042 of each TVC 1030 for supplying the steam 69 to the steam path 1042. In this way, the steam 69 cools the walls of each of the plurality of TVCs 1030. The steam injector 1044 is disposed through the third wall 1036 and is positioned generally radially aligned with the second wall 1034. The steam injector 1044, however, can be positioned anywhere along the walls of each respective TVC 1030.

Each TVC 1030 includes one or more TVC air holes 1046 defined through the first wall 1032. The one or more TVC air holes 1046 operably direct the compressed air 65 through the first wall 1032 into each TVC 1030 and generate a first vortex 1047. The steam system also includes one or more steam injection holes 1048 defined through the second wall 1034 and one or more steam cooling holes 1050. The one or more steam injection holes 1048 operably direct the steam 69 from the steam path 1042 through the second wall 1034 into each TVC 1030 to generate a second vortex 1049.

Each TVC 1030 includes one or more steam cooling holes 1050 disposed through at least one of the walls of each TVC 1030. The one or more steam cooling holes 1050 provide fluid communication between the steam path 1042 and each TVC 1030 for cooling the walls of each TVC 1030 with the steam 69 (e.g., by film cooling). In particular, the one or more steam cooling holes 1050 are disposed to provide fluid communication between the steam path 1042 and the downstream portion 1033. The one or more steam cooling holes 1050 include one or more first steam cooling holes 1050*a* disposed through the fourth wall 1038 and one or more second steam cooling holes 1050*b* disposed through the partition wall 1037. The one or more first steam cooling holes 1050*a* operably direct the steam 69 from the steam path 1042 therethrough to cool the fourth wall 1038. The one or more second steam cooling holes 1050*b* operably direct the steam 69 from the steam path 1042 therethrough to cool the partition wall 1037. The combustor 1000 also includes a diffuser section 1060 defined between the outer combustor casing 1008 and the inner combustor casing 1009 and upstream of the combustion chamber 1002 and the plurality of TVCs 1030 (e.g., upstream of the annular dome 1010). The diffuser section 1060 is in fluid communication with the HP compressor 24 (FIG. 1) for receiving the compressed air 65 from the HP compressor 24.

In operation, the combustor 1000 receives the compressed air 65 that is discharged from the HP compressor (e.g., the HP compressor 24 of FIG. 1) in the diffuser section 1060 at a location upstream of the combustion chamber 1002. A portion of the compressed air 65 is channeled through the first mixing assembly 1012. For example, the compressed air 65 is channeled through the first mixing assembly swirler 1016, and the first mixing assembly swirler 1016 swirls the compressed air 65. At the first mixing assembly 1012, the compressed air 65 is mixed with the fuel 67 from the first fuel injector 1018 and discharged into the combustion chamber 1002. The first fuel injector 1018 injects the fuel 67 radially inward into the first combustion zone 1002*a* of the combustion chamber 1002 to generate a first fuel stream 1070. At the first mixer 1014, the first fuel stream 1070 is mixed with a first compressed air stream 1072 to generate a first fuel-air mixture. The first fuel-air mixture is ignited by an igniter (not shown in FIG. 10 for clarity) for generating a first flame within the combustion chamber 1002 that burns the first fuel-air mixture and provides combustion gases 66 that are channeled downstream to a first stage turbine nozzles of the HP turbine (e.g., the HP turbine 28 of FIG. 1). The first flame burns within the first combustion zone 1002*a* (e.g., adjacent to the first mixer 1014 and within an area of the annular dome 1010) and generates the combustion gases 66 within the combustion chamber 1002.

A portion of the compressed air 65 is also injected through the one or more TVC air holes 1046 into each TVC 1030. For example, the compressed air 65 is injected radially inward through the one or more TVC air holes 1046 into the upstream portion 1031. The compressed air 65 injected into the upstream portion 1031 produces the first vortex 1047 within the upstream portion 1031. The second fuel injector 1024 injects the fuel 67 axially into the upstream portion 1031 (e.g., axially aftward into the first TVC 1030*a* and axially forward into the second TVC 1030*b*). For example, the plurality of second mixing assemblies 1020 is disposed through the third wall 1036 such that the second fuel injector 1024 injects the fuel 67 axially into the upstream portion 1031. In the upstream portion 1031, the fuel 67 includes a second fuel stream 1074 that is mixed with a second compressed air stream 1076 to generate a second fuel-air mixture. The second fuel-air mixture is ignited by an igniter (not shown in FIG. 10 for clarity) for generating a second flame within the upstream portion 1031 that burns the second fuel-air mixture and provides combustion gases 66 that are channeled downstream to the downstream portion 1033. The second flame burns within the second combustion zone 1002*b* in the plurality of TVCs 1030. The first vortex 1047 traps the second flame within the upstream portion 1031 such that the fuel-air mixture combusts entirely within the upstream portion 1031 and produces the combustion gases 66 within the upstream portion 1031. In this way, the upstream portion 1031 is a primary TVC that traps the second flame via the first vortex 1047.

Each TVC 1030 operably directs the combustion gases 66 from the upstream portion 1031, through the axial gap 1039, and into the downstream portion 1033, in which the combustion gases 66 mix with the steam 69. For example, the one or more steam injection holes 1048 operably direct the steam 69 from the steam path 1042 and into the downstream portion 1033, thereby generating a steam injection stream 1080 and generating the second vortex 1049 within the downstream portion 1033. In this way, the steam injection stream 1080 is downstream of the second fuel-air mixture. The one or more steam injection holes 1048 operably direct the steam 69 radially outward into the downstream portion 1033. The second vortex 1049 operably mixes the combustion gases 66 from the upstream portion 1031 with the steam injection stream 1080 to generate a first steam-combustion gases mixture 1090. The downstream portion 1033 operably directs the first steam-combustion gases mixture 1090 through the TVC opening 1040 and into the combustion chamber 1002 downstream of the first combustion zone 1002*a*. The combustion gases 66 from the first combustion zone 1002*a* mix with the first steam-combustion gases mixture 1090 from each TVC 1030 within the combustion chamber 1002 to generate a second steam-combustion gases mixture 1092. The combustion chamber 1002 then operably directs the second steam-combustion gases mixture 1092 to exit the combustion chamber 1002 through the combustion chamber outlet 1011, and the second steam-combustion gases mixture 1092 is channeled downstream to the first stage turbine nozzle of the HP turbine (e.g., the HP turbine 28 of FIG. 1).

Figure 11:
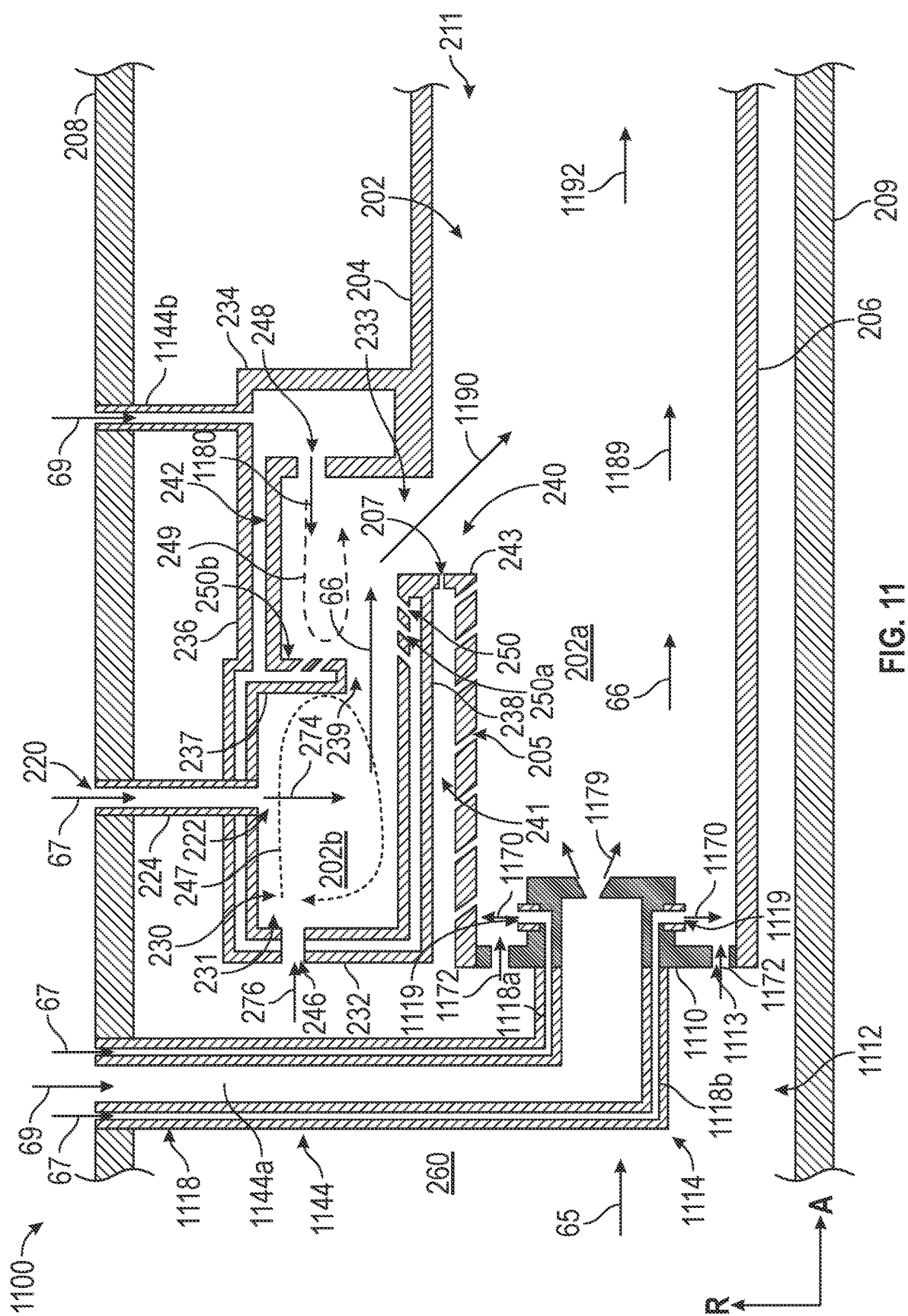
FIG. 11 is a schematic cross-sectional diagram of a combustor for a turbine engine, taken along a longitudinal centerline axis of the turbine engine, according to another embodiment.

FIG. 11 is a schematic cross-sectional diagram of a combustor 1100 for a turbine engine, taken along a longitudinal centerline axis of the turbine engine, according to another embodiment. The combustor 1100 is substantially similar to the combustor 200 of FIG. 2. The same reference numerals will be used for components of the combustor 1100 that are the same as or similar to the components of the combustor 200 discussed above. The description of these components above also applies to this embodiment, and a detailed description of these components is omitted here. The combustor 1100 includes a plurality of first mixing assemblies 1112 and an annular dome 1110 that are different than the plurality of first mixing assemblies 212 and the annular dome 210 of FIG. 2.

The plurality first mixing assemblies 1112 includes a first mixer 1114. A plurality of first fuel injectors 1118 (only one is illustrated in FIG. 11) is coupled in flow communication with each respective first mixing assembly 1112. The plurality of first fuel injectors 1118 includes a first fuel injector line 1118*a* and a second fuel injector line 1118*b*. The first fuel injector line 1118*a* injects the fuel 67 radially outward into the combustion chamber 202, and the second fuel injector line 1118*b* injects 70 the fuel 67 radially inward into the combustion chamber 202, as detailed further below. The first fuel injector line 1118a and the second fuel injector line 1118b are annular and include one or more fuel apertures 1119 spaced circumferentially about the first fuel injector line 1118a and the second fuel injector line 1118b that inject the fuel 67 therethrough and into the combustion chamber 202.

A steam system (e.g., the steam system 90 of FIG. 1) includes a plurality of steam injectors 1144. The plurality of steam injectors 1144 includes a first steam injector 1144a and a second steam injector 1144b. The first steam injector 1144a is disposed within the first fuel injector 1118 and inject the steam 69 axially aftward into the combustion chamber 202, as detailed further below. The second steam injector 1144b is substantially similar to the steam injector 244 of FIG. 2 and is disposed through the third wall 236. The annular dome 1110 includes one or more dome holes 1113 that extend axially therethrough.

In operation, the plurality of first fuel injectors 1118 injects the fuel 67 radially into the first combustion zone 202a to generate a first fuel stream 1170. For example, the first fuel injector line 1118a injects the fuel 67 through the one or more fuel apertures 1119 radially into the first combustion zone 202a, and the second fuel injector line 1118b injects the fuel 67 through the one or more fuel apertures 1119 radially into the first combustion zone 202a. The one or more dome holes 1113 operably direct the compressed air 65 therethrough to generate a first compressed air stream 1172 therethrough and into the first combustion zone 202a. The first mixer 214 mixes the first fuel stream 1170 and the first compressed air stream 1172 to generate a first fuel-air mixture that is ignited within the first combustion zone 202a. The first steam injector 1144a injects the steam 69 therethrough and into the first combustion zone 202a to generate a first steam injection stream 1179. The second steam injector 1144b injects the steam 69 through the one or more steam injection holes 248 and into the downstream portion 233 to generate a second steam injection stream 1180. The combustion gases 66 from the first combustion zone 202a mix with the first steam injection stream 1179 to generate a first steam-combustion gases mixture 1189 within the first combustion zone 202a that is directed downstream within the combustion chamber 202.

The combustion gases 66 from the upstream portion 231 of the TVC 230 mix with the second steam injection stream 1180 within the downstream portion 233 to generate a second steam-combustion gases mixture 1190. The second steam-combustion gases mixture 1190 is directed through the TVC opening 240 and enter the combustion chamber 202 downstream of the first combustion zone 202a. The second steam-combustion gases mixture 1190 mixes with the first steam-combustion gases mixture 1189 to generate a third steam-combustion gases mixture 1192 that is channeled downstream to the first stage turbine nozzle of the HP turbine (e.g., the HP turbine 28 of FIG. 1).

The first steam injector 1144a injects the steam 69 such that the first steam injection stream 1179 includes a lesser amount of the steam 69 compared to the second steam injection stream 1180 within the TVC 230. For example, zero percent to thirty percent (0% to 30%) of the steam 69 injected into the combustor 1100 is injected through the first steam injector 1144a, while seventy percent to one hundred percent (70% to 100%) of the steam 69 injected into the combustor 1100 is injected through the second steam injector 1144b. In some operating conditions, the first steam injector 1144a does not inject the steam 69 into the first combustion zone 202a such that no steam is injected into the first combustion zone 202a. For example, the total WAR in the combustor 1100 provided by the first steam injector 1144a and the second steam injector 1144b is zero percent to thirty percent (0% to 30%) during low-power conditions, is one percent to forty percent (1% to 40%) during mid-power conditions, and is two percent to sixty percent (2% to 60%) during high-power conditions. Accordingly, the combustor 1100 provides for reduced SFC, while also enabling improved operability (e.g., avoiding flameout), as compared to combustors without the benefit of the present disclosure.

Figure 12:
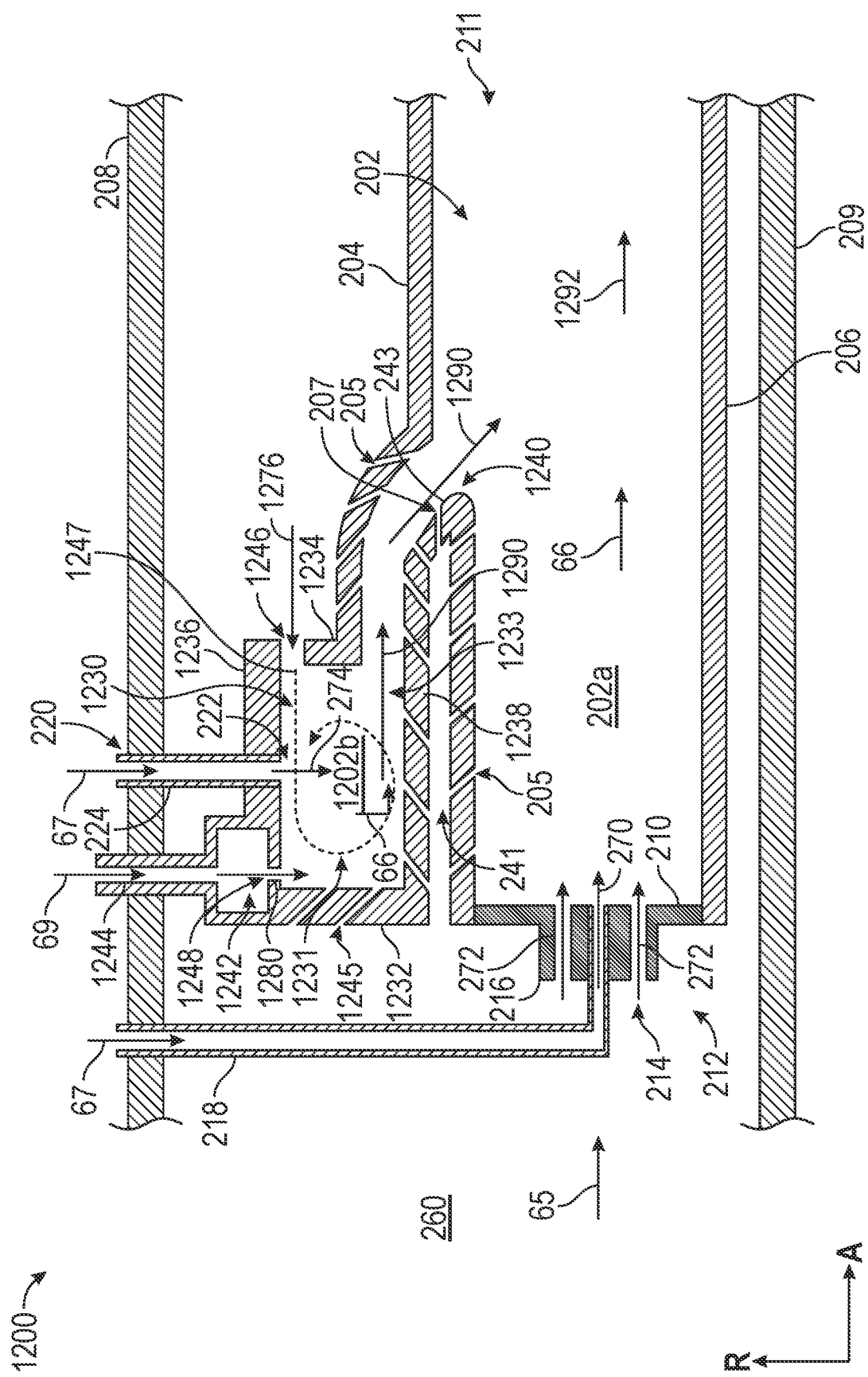
FIG. 12 is a schematic cross-sectional diagram of a combustor for a turbine engine, taken along a longitudinal centerline axis of the turbine engine, according to another embodiment.

FIG. 12 is a schematic cross-sectional diagram of a combustor 1200 for a turbine engine, taken along a longitudinal centerline axis of the turbine engine, according to another embodiment. The combustor 1200 is substantially similar to the combustor 200 of FIG. 2. The combustor 1200, however, includes a TVC 1230 and a steam injector 1244 that are different than the TVC 230 and the steam injector 244 of FIG. 2, respectively.

The TVC 1230 is defined by one or more walls (collectively referred to as the walls of the TVC 1230). For example, the TVC 1230 is defined by a first wall 1232, a second wall 1234, a third wall 1236, and a fourth wall 1238. The TVC 1230 does not include a radial partition wall, but includes a second combustion zone 1202b, an upstream portion 1231, and a downstream portion 1233 that is downstream of the upstream portion 1231. The TVC 1230 also includes a TVC opening 1240 defined between the fourth wall 1238 and the outer liner 204. The outer liner 204 is bent radially outward and extends axially to define the TVC opening 1240 such that the TVC opening 1240 is formed as a converging nozzle from the downstream portion 1233 of the TVC 1230. In FIG. 12, the second combustion zone 1202b is in the downstream portion 1233 of the TVC 1230 and the steam 69 is injected into the upstream portion 1231.

At least one of the walls that define the TVC 1230 include a steam path 1242. For example, the steam path 1242 is defined in a portion of the third wall 1236. The steam path 1242 can be defined in any of the walls that define the TVC 1230, similar to any of the embodiments detailed herein. In some embodiments, the compressed air 65 is directed about the walls of the TVC 1230 to cool the walls. The TVC 1230 includes one or more TVC cooling holes 1245 disposed through one or more of the walls of the TVC 1230. For example, the one or more TVC cooling holes 1245 are disposed through the first wall 1232 and the fourth wall 1238. The TVC 1230 also includes one or more TVC air holes 1246 disposed through the second wall 1234.

A steam system (e.g., the steam system 90 of FIG. 1) includes the steam injector 1244. The steam injector 1244 is disposed through the third wall 1236 and is positioned upstream of the plurality of second fuel injectors 224. In this way, the steam injector 1244 injects the steam 69 radially into the upstream portion 1231 of the TVC 1230, as detailed further below. The steam injector 1244 includes one or more steam injection holes 1248 disposed through the third wall 1236 to inject the steam 69 into the upstream portion 1231.

The combustor 1200 operates substantially similarly to the combustor 200 of FIG. 2. The one or more TVC air holes 1246 directs the compressed air 65 therethrough to generate a second compressed air stream 1276 in the TVC 1230. The steam injector 1244 injects the steam 69 into the upstream portion 1231 to generate a steam injection stream 1280 in the upstream portion 1231 of the TVC 1230. The steam injection stream 1280 is injected upstream of the second fuel stream 274 and upstream of the second combustion zone 202b. The TVC 1230 operably directs the steam injection stream 1280 downstream and the steam injection stream 1280 mixes with the combustion gases 66 by a vortex 1247 in the TVC 1230 to generate a first steam-combustion gases mixture 1290. The TVC 1230 operably directs the first steam-combustion gases mixture 1290 downstream and through the TVC opening 1240 and into the combustion chamber 202 downstream of the first combustion zone 202*a*. The first steam-combustion gases mixture 1290 mix with the combustion gases 66 from the first combustion zone 202*a* to generate a second steam-combustion gases mixture 1292. The second steam-combustion gases mixture 1292 is then channeled downstream to the first stage turbine nozzle of the HP turbine (e.g., the HP turbine 28 of FIG. 1).

Accordingly, the embodiments of the present disclosure detailed herein provide for a first flame in a first combustion zone within the combustion chamber, a second flame in a second combustion zone within the TVC, and injecting steam into the TVC. The first flame in the first combustion zone provides for flame stability within the combustor at different operating conditions (e.g., low-power, mid-power, and high-power). The TVC enables a greater amount of steam to be injected into the combustor without sacrificing operability of the combustor, as compared to combustors without the benefit of the present disclosure. For example, typically a high amount of steam injected into the combustor leads to flameout of the flame, but the present disclosure provides for the steam to be injected into the TVC, away from the first combustion zone in the combustion chamber, to avoid flameout of the first flame in the first combustion zone. Such a configuration of injecting the steam downstream of the flames and within the TVC away from the first combustion zone enables a greater amount of steam that can be injected into the combustor, as compared to combustors without the benefit of the present disclosure. For example, the combustion in the first combustion zone and the steam injection into the TVC prevents the steam from flowing near the first flame within the combustion chamber. In this way, the present disclosure allows for a greater amount of steam to be injected into the combustor, while preventing the steam from choking the flame within the combustion chamber, thereby reducing emissions (e.g., $NO_x$ emissions, nvPM emissions, CO, and noise) and reducing SFC, while providing for flame stability (e.g., avoiding flameout), as compared to combustors without the benefit of the present disclosure.

Further aspects of the present disclosure are provided by the subject matter of the following clauses.

A combustor comprising a combustion chamber, an annular dome, and a trapped vortex cavity. The combustion chamber includes an outer liner and an inner liner and defines a first combustion zone. The annular dome is coupled to the outer liner and the inner liner at a forward end of the combustion chamber. The trapped vortex cavity extends from at least one of the outer liner or the inner liner and defines a second combustion zone. A plurality of first mixing assemblies are disposed through the annular dome, the plurality of first mixing assemblies operably injecting a first fuel-air mixture into the first combustion zone. A plurality of second mixing assemblies are disposed through the outer liner or the inner liner at the trapped vortex cavity, the plurality of second mixing assemblies operably injecting a second fuel-air mixture into the second combustion zone to produce combustion gases. A steam system includes a steam injector in fluid communication with the trapped vortex cavity, the steam injector operably injecting steam into the trapped vortex cavity, and the combustion gases mixing with the steam in the trapped vortex cavity.

The combustor of the preceding clause, the steam injector being positioned to operably inject the steam into the trapped vortex cavity upstream or downstream of the second combustion zone.

The combustor of any preceding clause, the trapped vortex cavity including a trapped vortex cavity opening defined in the outer liner or the inner liner such that the trapped vortex cavity is in fluid communication with the combustion chamber.

The combustor of any preceding clause, the trapped vortex cavity opening being positioned downstream of the first combustion zone.

The combustor of any preceding clause, the trapped vortex cavity mixing the combustion gases with the steam to generate a steam-combustion gases mixture in the trapped vortex cavity, and the trapped vortex cavity operably injects the steam-combustion gases mixture through the trapped vortex cavity opening downstream of the first combustion zone.

The combustor of any preceding clause, the trapped vortex cavity being defined by one or more walls.

The combustor of any preceding clause, at least one of the one or more walls being spaced from the outer liner or the inner liner such that a gap is defined between the at least one of the one or more walls and the outer liner or the inner liner.

The combustor of any preceding clause, further comprising a steam path defined in at least one of the one or more walls, the steam path operably directing the steam through the at least one of the one or more walls.

The combustor of any preceding clause, at least one of the one or more walls including steam injection holes, the steam injection holes operably injecting the steam therethrough and into the trapped vortex cavity.

The combustor of any preceding clause, at least one of the one or more walls including steam cooling holes, the steam cooling holes operably directing the steam therethrough to cool the at least one of the one or more walls.

The combustor of any preceding clause, the steam system including one or more steam lines for providing the steam to the steam injector.

The combustor of any preceding clause, the steam system generating steam from exhaust of the turbine engine.

The combustor of any preceding clause, a water-to-air ratio of the steam injected into the trapped vortex cavity being 0.0% to 60%.

The combustor of any preceding clause, the water-to-air ratio of the steam injected into the trapped vortex cavity being 5% to 60%.

The combustor of any preceding clause, the water-to-air ratio being zero percent to thirty percent (0% to 30%) during low-power conditions, being one percent to forty percent (1% to 40%) during mid-power conditions, and being two percent to sixty percent (2% to 60%) during high-power conditions.

The combustor of any preceding clause, the steam injector operably injecting the steam downstream of the second combustion zone.

The combustor of any preceding clause, the steam injector operably injecting the steam upstream of the second combustion zone.

The combustor of any preceding clause, the outer liner and the inner liner including one or more liner air holes that operably direct compressed air into the combustion chamber.

The combustor of any preceding clause, the first combustion zone being defined adjacent the annular dome within the combustion chamber.

The combustor of any preceding clause, each of the plurality of first mixing assemblies including a first mixer and a first fuel injector.

The combustor of any preceding clause, each of the plurality of first mixing assemblies including a first mixing assembly swirler that operably swirls the compressed air.

The combustor of any preceding clause, each of the plurality of second mixing assemblies including a second fuel injector.

The combustor of any preceding clause, the combustor defining an axial direction, a radial direction, and a circumferential direction.

The combustor of any preceding clause, the one or more walls that define the trapped vortex cavity include a first wall, a second wall, a third wall, and a fourth wall.

The combustor of the preceding clause, the first wall being angled with respect to the axial direction.

The combustor of any preceding clause, the first wall being angled greater than 0° and less than 90° with respect to the axial direction.

The combustor of any preceding clause, the first wall being 90° with respect to the axial direction.

The combustor of any preceding clause, the first wall being greater than 90° with respect to the axial direction.

The combustor of any preceding clause, the trapped vortex cavity opening being located axially aft of the annular dome.

The combustor of any preceding clause, the first wall and the second wall extending generally radially, and the third wall and the fourth wall extending generally axially.

The combustor of any preceding clause, the first wall and the second wall extending generally axially and the third wall and the fourth wall extending generally radially.

The combustor of any preceding clause, the trapped vortex cavity having a generally rectangular cross section.

The combustor of any preceding clause, the fourth wall being spaced from the outer liner or the inner liner such that the gap is defined between the fourth wall and the outer liner.

The combustor of any preceding clause, the gap being radial.

The combustor of any preceding clause, the gap being axial.

The combustor of any preceding clause, the fourth wall being coupled to the outer liner or the inner liner by a liner extension portion.

The combustor of any preceding clause, the liner extension portion including one or more liner extension portion holes that operably direct the compressed air therethrough.

The combustor of any preceding clause, the trapped vortex cavity including an upstream portion and a downstream portion.

The combustor of any preceding clause, the second combustion zone being defined in the upstream portion of the trapped vortex cavity.

The combustor of any preceding clause, the steam injector injecting the steam in the downstream portion of the trapped vortex cavity.

The combustor of any preceding clause, the plurality of second mixing assemblies injecting the compressed air into the trapped vortex cavity to generate a first vortex within the trapped vortex cavity.

The combustor of any preceding clause, the steam injector injecting the steam through the one or more steam injection holes to generate a second vortex in the trapped vortex cavity.

The combustor of any preceding clause, the first vortex being generated in the upstream portion of the trapped vortex cavity.

The combustor of any preceding clause, the second vortex being generate in the downstream portion of the trapped vortex cavity.

The combustor of any preceding clause, the trapped vortex cavity opening being defined at the downstream portion of the trapped vortex cavity.

The combustor of any preceding clause, at least one of the one or more walls that define the trapped vortex cavity including a partition wall that extends into the trapped vortex cavity.

The combustor of any preceding clause, the partition wall dividing the trapped vortex cavity into the upstream portion and the downstream portion.

The combustor of any preceding clause, a volume of the upstream portion being greater than a volume of the downstream portion.

The combustor of any preceding clause, at least one of the one or more walls of the trapped vortex cavity include one or more trapped vortex cavity air holes that operably direct the compressed air into the trapped vortex cavity.

The combustor of any preceding clause, the one or more trapped vortex cavity air holes operably directing the compressed air into the upstream portion of the trapped vortex cavity.

The combustor of any preceding clause, the one or more trapped vortex cavity air holes being positioned through the first wall to operably direct the compressed air substantially axially aftward into the trapped vortex cavity.

The combustor of any preceding clause, the one or more trapped vortex cavity air holes being positioned through the second wall to operably direct the compressed air substantially axially forward into the trapped vortex cavity.

The combustor of any preceding clause, the one or more trapped vortex cavity air holes being positioned on through the third wall to operably direct the compressed air substantially radially into the trapped vortex cavity.

The combustor of any preceding clause, the one or more steam injection holes being positioned through the second wall to operably direct the steam axially forward into the trapped vortex cavity.

The combustor of any preceding clause, the one or more steam injection holes being positioned through the third wall to operably direct the steam radially into the trapped vortex cavity.

The combustor of any preceding clause, the second fuel injector being disposed through the third wall to operably inject the fuel radially into the trapped vortex cavity.

The combustor of any preceding clause, the second fuel injector being disposed through the first wall to operably inject the fuel axially aftward into the trapped vortex cavity.

The combustor of any preceding clause, the first fuel injector being disposed through the annular dome to inject the fuel axially aftward into the first combustion zone.

The combustor of any preceding clause, the first fuel injector being disposed through the annular dome to inject the fuel radially into the first combustion zone. The combustor of any preceding clause, the outer liner and the inner liner extending radially inward.

The combustor of any preceding clause, the outer liner and the inner liner extending substantially axially.

The combustor of any preceding clause, the first fuel injector including one or more fuel injector lines that inject the fuel radially into the combustion chamber.

The combustor of any preceding clause, the first fuel injector including a first fuel injector line and a second fuel injector line.

The combustor of any preceding clause, the first fuel injector line and the second fuel injector line being annular.

The combustor of any preceding clause, the first fuel injector line and the second fuel injector liner including one or more fuel apertures spaced circumferentially about the first fuel injector line and the second fuel injector line that operably direct the fuel into the combustion chamber.

The combustor of any preceding clause, the steam injector including a steam swirler that operably swirls the steam to generate a steam swirl in the trapped vortex cavity.

The combustor of any preceding clause, the one or more steam injection holes including one or more first steam injection holes positioned on the steam injector outside of the trapped vortex cavity, and one or more second steam injection holes positioned to inject the steam into the trapped vortex cavity.

The turbine engine of the preceding clause, the one or more second steam injection holes being separate from the steam injector, the one or more second steam injection holes operably directing the compressed air and the steam from outside the trapped vortex cavity into the trapped vortex cavity.

The combustor of any preceding clause, the trapped vortex cavity including a steam injection hole extension about the one or more second steam injection holes that operably direct the steam through the steam injection hole extension.

The combustor of any preceding clause, the steam-combustion gases mixture being a first steam-combustion gases mixture, the combustion chamber operably mixing the first steam-combustion gases mixture with the combustion gases from the first combustion zone to generate a second steam-combustion gases mixture.

The combustor of any preceding clause, the steam injector including a first steam injector and a second steam injector, the first steam injector being disposed through the annular dome to inject the steam into the first combustion zone, and the second steam injector being disposed through the walls of the trapped vortex cavity to inject the steam into the trapped vortex cavity.

The combustor of any preceding clause, the plurality of first mixing assemblies including the first fuel injector and the first steam injector.

The combustor of any preceding clause, the trapped vortex cavity including a plurality of trapped vortex cavities including a first trapped vortex cavity defined in the outer liner and a second trapped vortex cavity defined in the inner liner.

The combustor of any preceding clause, the first trapped vortex cavity being radially outward from the outer liner.

The combustor of any preceding clause, the second trapped vortex cavity being radially inward from the inner liner.

The combustor of any preceding clause, the first trapped vortex cavity being axially forward of the inner liner.

The combustor of any preceding clause, the second trapped vortex cavity being axially aft of the outer liner.

A turbine engine comprising a fan and a core turbine engine comprising a compressor section, a combustion section, and a turbine section. The combustion section comprises a combustor comprising a combustion chamber, an annular dome, and a trapped vortex cavity. The combustion chamber includes an outer liner and an inner liner and defines a first combustion zone. The annular dome is coupled to the outer liner and the inner liner at a forward end of the combustion chamber. The trapped vortex cavity extends from at least one of the outer liner or the inner liner and defines a second combustion zone. A plurality of first mixing assemblies are disposed through the annular dome, the plurality of first mixing assemblies operably injecting a first fuel-air mixture into the first combustion zone. A plurality of second mixing assemblies are disposed through the outer liner or the inner liner at the trapped vortex cavity, the plurality of second mixing assemblies operably injecting a second fuel-air mixture into the second combustion zone to produce combustion gases. A steam system includes a steam injector in fluid communication with the trapped vortex cavity, the steam injector operably injecting steam into the trapped vortex cavity, and the steam mixing with the combustion gases in the trapped vortex cavity.

The turbine engine of the preceding clause, the steam injector being positioned to operably inject the steam into the trapped vortex cavity upstream or downstream of the second combustion zone.

The turbine engine of any preceding clause, the trapped vortex cavity including a trapped vortex cavity opening defined in the outer liner or the inner liner such that the trapped vortex cavity is in fluid communication with the combustion chamber.

The turbine engine of any preceding clause, the trapped vortex cavity opening being positioned downstream of the first combustion zone.

The turbine engine of any preceding clause, the trapped vortex cavity mixing the combustion gases with the steam to generate a steam-combustion gases mixture in the trapped vortex cavity, and the trapped vortex cavity operably injects the steam-combustion gases mixture through the trapped vortex cavity opening downstream of the first combustion zone.

The turbine engine of any preceding clause 1, the trapped vortex cavity being defined by one or more walls.

The turbine engine of any preceding clause, at least one of the one or more walls being spaced from the outer liner or the inner liner such that a gap is defined between the at least one of the one or more walls and the outer liner or the inner liner.

The turbine engine of any preceding clause, further comprising a steam path defined in at least one of the one or more walls, the steam path operably directing the steam through the at least one of the one or more walls.

The turbine engine of any preceding clause, at least one of the one or more walls including steam injection holes, the steam injection holes operably injecting the steam therethrough and into the trapped vortex cavity.

The turbine engine of any preceding clause, at least one of the one or more walls including steam cooling holes, the steam cooling holes operably directing the steam therethrough to cool the at least one of the one or more walls.

The turbine engine of any preceding clause, the steam system including one or more steam lines for providing the steam to the steam injector.

The turbine engine of any preceding clause, the steam system generating steam from exhaust of the turbine engine.

The turbine engine of any preceding clause, a water-to-air ratio of the steam injected into the trapped vortex cavity being 0.0% to 60%.

The turbine engine of any preceding clause, the water-to-air of the steam injected into the trapped vortex cavity being 5% to 60%.

The turbine engine of any preceding clause, the water-to-air ratio being zero percent to thirty percent (0% to 30%)

during low-power conditions, being one percent to forty percent (1% to 40%) during mid-power conditions, and being two percent to sixty percent (2% to 60%) during high-power conditions.

The turbine engine of any preceding clause, the steam injector operably injecting the steam downstream of the second combustion zone.

The turbine engine of any preceding clause, the steam injector operably injecting the steam upstream of the second combustion zone.

The turbine engine of any preceding clause, the outer liner and the inner liner including one or more liner air holes that operably direct compressed air into the combustion chamber.

The turbine engine of any preceding clause, the first combustion zone being defined adjacent the annular dome within the combustion chamber.

The turbine engine of any preceding clause, each of the plurality of first mixing assemblies including a first mixer and a first fuel injector.

The turbine engine of any preceding clause, each of the plurality of first mixing assemblies including a first mixing assembly swirler that operably swirls the compressed air.

The turbine engine of any preceding clause, each of the plurality of second mixing assemblies including a second fuel injector.

The turbine engine of any preceding clause, the combustor defining an axial direction, a radial direction, and a circumferential direction.

The turbine engine of any preceding clause, the one or more walls that define the trapped vortex cavity include a first wall, a second wall, a third wall, and a fourth wall.

The turbine engine of the preceding clause, the first wall being angled with respect to the axial direction.

The turbine engine of any preceding clause, the first wall being angled greater than 0° and less than 90° with respect to the axial direction.

The turbine engine of any preceding clause, the first wall being 90° with respect to the axial direction.

The turbine engine of any preceding clause, the first wall being greater than 90° with respect to the axial direction.

The turbine engine of any preceding clause, the trapped vortex cavity opening being located axially aft of the annular dome.

The turbine engine of any preceding clause, the first wall and the second wall extending generally radially, and the third wall and the fourth wall extending generally axially.

The turbine engine of any preceding clause, the first wall and the second wall extending generally axially and the third wall and the fourth wall extending generally radially.

The turbine engine of any preceding clause, the trapped vortex cavity having a generally rectangular cross section.

The turbine engine of any preceding clause, the fourth wall being spaced from the outer liner or the inner liner such that the gap is defined between the fourth wall and the outer liner.

The turbine engine of any preceding clause, the gap being radial.

The turbine engine of any preceding clause, the gap being axial.

The turbine engine of any preceding clause, the fourth wall being coupled to the outer liner or the inner liner by a liner extension portion.

The turbine engine of any preceding clause, the liner extension portion including one or more liner extension portion holes that operably direct the compressed air therethrough.

The turbine engine of any preceding clause, the trapped vortex cavity including an upstream portion and a downstream portion.

The turbine engine of any preceding clause, the second combustion zone being defined in the upstream portion of the trapped vortex cavity.

The turbine engine of any preceding clause, the steam injector injecting the steam in the downstream portion of the trapped vortex cavity.

The turbine engine of any preceding clause, the plurality of second mixing assemblies injecting the compressed air into the trapped vortex cavity to generate a first vortex within the trapped vortex cavity.

The turbine engine of any preceding clause, the steam injector injecting the steam through the one or more steam injection holes to generate a second vortex in the trapped vortex cavity.

The turbine engine of any preceding clause, the first vortex being generated in the upstream portion of the trapped vortex cavity.

The turbine engine of any preceding clause, the second vortex being generate in the downstream portion of the trapped vortex cavity.

The turbine engine of any preceding clause, the trapped vortex cavity opening being defined at the downstream portion of the trapped vortex cavity.

The turbine engine of any preceding clause, at least one of the one or more walls that define the trapped vortex cavity including a partition wall that extends into the trapped vortex cavity.

The turbine engine of any preceding clause, the partition wall dividing the trapped vortex cavity into the upstream portion and the downstream portion.

The turbine engine of any preceding clause, a volume of the upstream portion being greater than a volume of the downstream portion.

The turbine engine of any preceding clause, at least one of the one or more walls of the trapped vortex cavity include one or more trapped vortex cavity air holes that operably direct the compressed air into the trapped vortex cavity.

The turbine engine of any preceding clause, the one or more trapped vortex cavity air holes operably directing the compressed air into the upstream portion of the trapped vortex cavity.

The turbine engine of any preceding clause, the one or more trapped vortex cavity air holes being positioned through the first wall to operably direct the compressed air substantially axially aftward into the trapped vortex cavity.

The turbine engine of any preceding clause, the one or more trapped vortex cavity air holes being positioned through the second wall to operably direct the compressed air substantially axially forward into the trapped vortex cavity.

The turbine engine of any preceding clause, the one or more trapped vortex cavity air holes being positioned on through the third wall to operably direct the compressed air substantially radially into the trapped vortex cavity.

The turbine engine of any preceding clause, the one or more steam injection holes being positioned through the second wall to operably direct the steam axially forward into the trapped vortex cavity.

The turbine engine of any preceding clause, the one or more steam injection holes being positioned through the third wall to operably direct the steam radially into the trapped vortex cavity.

The turbine engine of any preceding clause, the second fuel injector being disposed through the third wall to operably inject the fuel radially into the trapped vortex cavity.

The turbine engine of any preceding clause, the second fuel injector being disposed through the first wall to operably inject the fuel axially aftward into the trapped vortex cavity.

The turbine engine of any preceding clause, the first fuel injector being disposed through the annular dome to inject the fuel axially aftward into the first combustion zone.

The turbine engine of any preceding clause, the first fuel injector being disposed through the annular dome to inject the fuel radially into the first combustion zone.

The turbine engine of any preceding clause, the outer liner and the inner liner extending radially inward.

The turbine engine of any preceding clause, the outer liner and the inner liner extending substantially axially.

The turbine engine of any preceding clause, the first fuel injector including one or more fuel injector lines that inject the fuel radially into the combustion chamber.

The turbine engine of any preceding clause, the first fuel injector including a first fuel injector line and a second fuel injector line.

The turbine engine of any preceding clause, the first fuel injector line and the second fuel injector line being annular.

The turbine engine of any preceding clause, the first fuel injector line and the second fuel injector liner including one or more fuel apertures spaced circumferentially about the first fuel injector line and the second fuel injector line that operably direct the fuel into the combustion chamber.

The turbine engine of any preceding clause, the steam injector including a steam swirler that operably swirls the steam to generate a steam swirl in the trapped vortex cavity.

The turbine engine of any preceding clause, the one or more steam injection holes including one or more first steam injection holes positioned on the steam injector outside of the trapped vortex cavity, and one or more second steam injection holes positioned to inject the steam into the trapped vortex cavity.

The turbine engine of the preceding clause, the one or more second steam injection holes being separate from the steam injector, the one or more second steam injection holes operably directing the compressed air and the steam from outside the trapped vortex cavity into the trapped vortex cavity.

The turbine engine of any preceding clause, the trapped vortex cavity including a steam injection hole extension about the one or more second steam injection holes that operably direct the steam through the steam injection hole extension.

The turbine engine of any preceding clause, the steam-combustion gases mixture being a first steam-combustion gases mixture, the combustion chamber operably mixing the first steam-combustion gases mixture with the combustion gases from the first combustion zone to generate a second steam-combustion gases mixture.

The turbine engine of any preceding clause, the steam injector including a first steam injector and a second steam injector, the first steam injector being disposed through the annular dome to inject the steam into the first combustion zone, and the second steam injector being disposed through the walls of the trapped vortex cavity to inject the steam into the trapped vortex cavity.

The turbine engine of any preceding clause, the plurality of first mixing assemblies including the first fuel injector and the first steam injector.

The turbine engine of any preceding clause, the trapped vortex cavity including a plurality of TVCs trapped vortex cavities including a first trapped vortex cavity defined in the outer liner and a second trapped vortex cavity defined in the inner liner.

The turbine engine of any preceding clause, the first trapped vortex cavity being radially outward from the outer liner.

The turbine engine of any preceding clause, the second trapped vortex cavity being radially inward from the inner liner.

The turbine engine of any preceding clause, the first trapped vortex cavity being axially forward of the inner liner.

The turbine engine of any preceding clause, the second trapped vortex cavity being axially aft of the outer liner.

A method of operating the combustor or the turbine engine of any preceding clause, the method comprising generating the first fuel-air mixture with the plurality of first mixing assemblies, injecting the first fuel-air mixture into the first combustion zone of the combustion chamber to generate a first flame, generating the second fuel-air mixture with the plurality of second mixing assemblies, injecting the second fuel-air mixture into the second combustion zone of the trapped vortex cavity to generate a second flame that produces combustion gases, and injecting the steam with the steam injector into the trapped vortex cavity such that the steam mixes with the combustion gases in the trapped vortex cavity.

The method of any preceding clause, further comprising injecting the steam into the trapped vortex cavity upstream or downstream of the second combustion zone.

The method of any preceding clause, further comprising generating a vortex within the trapped vortex cavity that mixes the second fuel-air mixture within the trapped vortex cavity.

The method of any preceding clause, further comprising generating the vortex within the trapped vortex cavity such that the second flame is trapped within the trapped vortex cavity.

The method of any preceding clause, the trapped vortex cavity including one or more walls and a steam path defined in at least one of the one or more walls, the method further comprising directing the steam through the steam path of the at least one of the one or more walls.

The method of any preceding clause, the trapped vortex cavity including one or more walls and at least one of the one or more walls includes steam injection holes, the method further comprising injecting the steam through the steam injection holes and into the trapped vortex cavity.

The method of any preceding clause, the trapped vortex cavity including one or more walls and at least one of the one or more walls includes steam cooling holes, the method further comprising directing the steam through the steam cooling holes to cool the at least one of the one or more walls.

The method of any preceding clause, further comprising injecting the steam with the steam injector during operating conditions of the turbine engine that are above idle conditions of the turbine engine.

The method of any preceding clause, further comprising injecting a greater amount of the steam during the high-power conditions than during the mid-power conditions.

The method of any preceding clause, further comprising mixing the combustion gases with the steam to generate a steam-combustion gases mixture in the trapped vortex cavity.

The method of any preceding clause, further comprising injecting the steam-combustion gases mixture from the trapped vortex cavity into the combustion chamber downstream of the first combustion zone.

The method of any preceding clause, further comprising providing the steam from the steam system to the steam injector through a steam line.

The method of any preceding clause, further comprising extracting, with the steam system, the steam from exhaust of the turbine engine.

The method of any preceding clause, a water-to-air ratio of the steam injected into the trapped vortex cavity being 0.0% to 60%.

The method of any preceding clause, the water-to-air ratio of the steam injected into the trapped vortex cavity being 5% to 60%.

The method of any preceding clause, the water-to-air ratio being zero percent to thirty percent (0% to 30%) during low-power conditions, being one percent to forty percent (1% to 40%) during mid-power conditions, and being two percent to sixty percent (2% to 60%) during high-power conditions.

The method of any preceding clause, further comprising injecting the steam downstream of the second combustion zone.

The method of any preceding clause, further comprising injecting the steam upstream of the second combustion zone.

The method of any preceding clause, further comprising directing compressed air into the combustion chamber through one or more liner air holes to cool the outer liner or the inner liner.

The method of any preceding clause, the plurality of first mixing assemblies including a first mixing assembly swirler, the method further comprising swirling the compressed air with the first mixing assembly swirler.

The method of any preceding clause, further comprising injecting the combustion gases from the trapped vortex cavity into the combustion chamber axially aft of the first combustion zone.

The method of any preceding clause, further comprising directing the steam through the steam path within the one or more walls of the trapped vortex cavity to cool the one or more walls of the trapped vortex cavity.

The method of any preceding clause, the trapped vortex cavity including an upstream portion and a downstream portion, the method further comprising injecting the steam with the steam injector into the downstream portion of the trapped vortex cavity.

The method of any preceding clause, the trapped vortex cavity including an upstream portion and a downstream portion, the method further comprising injecting the steam with the steam injector into the upstream portion of the trapped vortex cavity.

The method of any preceding clause, further comprising injecting the compressed air into the trapped vortex cavity and generating a first vortex of the compressed air within the trapped vortex cavity.

The method of any preceding clause, further comprising injecting the steam into the trapped vortex cavity and generating a second vortex of the steam within the trapped vortex cavity.

The method of any preceding clause, further comprising generating the first vortex in the upstream portion of the trapped vortex cavity.

The method of any preceding clause, further comprising generating the second vortex in the downstream portion of the trapped vortex cavity.

The method of any preceding clause, further comprising generating a first fuel stream in the first combustion zone with the plurality of first mixing assemblies.

The method of any preceding clause, further comprising generating a first compressed air stream in the first combustion zone with the plurality of first mixing assemblies.

The method of any preceding clause, further comprising mixing the first fuel stream and the first compressed air stream to generate the first fuel-air mixture in the first combustion zone.

The method of any preceding clause, at least one of the one or more walls including one or more trapped vortex cavity air holes, the method further comprising directing the compressed air into the trapped vortex cavity through the one or more trapped vortex cavity air holes.

The method of any preceding clause, further comprising directing the compressed air into the upstream portion of the trapped vortex cavity through the one or more trapped vortex cavity air holes.

The method of any preceding clause, further comprising directing the compressed air axially forward into the trapped vortex cavity through the one or more trapped vortex cavity air holes.

The method of any preceding clause, further comprising directing the compressed air radially into the trapped vortex cavity through the one or more trapped vortex cavity air holes.

The method of any preceding clause, further comprising directing the compressed air into the trapped vortex cavity at an angle greater than 0° and less than 90° with respect to the axial direction.

The method of any preceding clause, the first wall being 90° with respect to the axial direction.

The method of any preceding clause, the first wall being greater than 90° with respect to the axial direction.

The method of any preceding clause, further comprising generating a second fuel stream in the second combustion zone with the plurality of second mixing assemblies.

The method of any preceding clause, further comprising generating a second compressed air stream in the second combustion zone with the plurality of second mixing assemblies.

The method of any preceding clause, further comprising mixing the second fuel stream and the second compressed air stream to generate the second fuel-air mixture in the second combustion zone.

The method of any preceding clause, further comprising injecting the steam axially forward into the trapped vortex cavity.

The method of any preceding clause, further comprising injecting the steam radially into the trapped vortex cavity.

The method of any preceding clause, the steam injector including a steam swirler, the method further comprising swirling the steam through the steam swirler to generate a steam swirl in the trapped vortex cavity.

The method of any preceding clause, further comprising injecting the first fuel stream axially aftward into the first combustion zone.

The method of any preceding clause, further comprising injecting the first fuel stream radially into the first combustion zone.

The method of any preceding clause, further comprising injecting the second fuel stream axially aftward into the trapped vortex cavity.

The method of any preceding clause, further comprising injecting the second fuel stream radially into the trapped vortex cavity.

The method of any preceding clause, the steam injector including one or more first steam injection holes, the method further comprising injecting the steam outside of the trapped vortex cavity through the one or more first steam injection holes.

The method of any preceding clause, the steam injector including one or more second steam injection holes, the method further comprising injecting the steam into the trapped vortex cavity through the one or more second steam injection holes.

The method of any preceding clause, further comprising injecting the steam through the one or more first steam injection holes to generate a first steam injection stream outside of the trapped vortex cavity.

The method of any preceding clause, further comprising injecting the first steam injection stream through the one or more second steam injection holes to generate a second steam injection stream in the trapped vortex cavity.

The method of any preceding clause, the trapped vortex cavity including a steam injection hole extension about the one or more second steam injection holes, the method further comprising directing the first steam injection stream through the steam injection hole extension.

The method of any preceding clause, further comprising mixing the first steam injection stream with the compressed air outside of the trapped vortex cavity.

The method of any preceding clause, the steam-combustion gases mixture being a first steam-combustion gases mixture, the method further comprising mixing the first stream-combustion gases mixture with the combustion gases from the first combustion zone to generate a second steam-combustion gases mixture.

The method of any preceding clause, the steam injector including a first steam injector, the method further comprising injecting the steam through the first steam injector into the first combustion zone.

The method of any preceding clause, the steam injector including a second steam injector, the method further comprising injecting the steam through the second steam injector into the second combustion zone.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A combustor comprising:
a combustion chamber including an outer liner and an inner liner and defining a first combustion zone;
an annular dome coupled to the outer liner and the inner liner at a forward end of the combustion chamber;
a trapped vortex cavity defined by one or more walls extending from at least one of the outer liner or the inner liner and defining a second combustion zone;
a plurality of first mixing assemblies disposed through the annular dome, the plurality of first mixing assemblies operably injecting a first fuel-air mixture into the first combustion zone;
a plurality of second mixing assemblies disposed through the outer liner or the inner liner at the trapped vortex cavity, the plurality of second mixing assemblies operably injecting a second fuel-air mixture into the second combustion zone to produce combustion gases; and
a steam system including:
a steam injector in fluid communication with the trapped vortex cavity, the steam injector being separate from the plurality of second mixing assemblies and operably injecting steam into the trapped vortex cavity separate from the second fuel-air mixture in the second combustion zone, and the steam mixing with the combustion gases in the trapped vortex cavity; and
a steam path defined along the one or more walls of the trapped vortex cavity and operably directing the steam through, and along, each of the one or more walls to cool the one or more walls.

2. The combustor of claim 1, wherein the steam injector is positioned to operably inject the steam into the trapped vortex cavity upstream or downstream of the second combustion zone.

3. The combustor of claim 1, wherein a water-to-air ratio of the steam injected into the trapped vortex cavity is 0.0% to 60%.

4. The combustor of claim 1, wherein the trapped vortex cavity includes a trapped vortex cavity opening defined in the outer liner or the inner liner such that the trapped vortex cavity is in fluid communication with the combustion chamber.

5. The combustor of claim 4, wherein the trapped vortex cavity opening is positioned downstream of the first combustion zone.

6. The combustor of claim 4, wherein the trapped vortex cavity mixes the combustion gases with the steam to generate a steam-combustion gases mixture in the trapped vortex cavity, and the trapped vortex cavity operably injects the steam-combustion gases mixture through the trapped vortex cavity opening downstream of the first combustion zone.

7. The combustor of claim 1, wherein at least one of the one or more walls is spaced from the outer liner or the inner liner such that a gap is defined between the at least one of the one or more walls and the outer liner or the inner liner.

8. The combustor of claim 1, wherein at least one of the one or more walls includes steam injection holes, the steam injection holes operably injecting the steam therethrough and into the trapped vortex cavity.

9. The combustor of claim 1, wherein at least one of the one or more walls includes steam cooling holes, the steam cooling holes operably directing the steam therethrough to cool the at least one of the one or more walls.

10. A method of operating the combustor of claim 1, the method comprising:
generating the first fuel-air mixture with the plurality of first mixing assemblies;
injecting the first fuel-air mixture into the first combustion zone to generate a first flame;
generating the second fuel-air mixture with the plurality of second mixing assemblies;
injecting the second fuel-air mixture into the second combustion zone to generate a second flame that produces the combustion gases;
directing the steam through the steam path along the one or more walls; and
injecting the steam with the steam injector into the trapped vortex cavity separate from the second fuel-air mixture in the second combustion zone such that the steam mixes with the combustion gases in the trapped vortex cavity.

11. The method of claim 10, further comprising injecting the steam into the trapped vortex cavity upstream or downstream of the second combustion zone.

12. The method of claim 10, further comprising generating a vortex within the trapped vortex cavity that mixes the second fuel-air mixture within the trapped vortex cavity.

13. The method of claim 10, wherein at least one of the one or more walls includes steam injection holes, the method further comprising injecting the steam through the steam injection holes and into the trapped vortex cavity.

14. The method of claim 10, wherein at least one of the one or more walls includes steam cooling holes, the method further comprising directing the steam through the steam cooling holes to cool the at least one of the one or more walls.

15. The method of claim 10, further comprising injecting the steam with the steam injector during operating conditions of the combustor that are above idle conditions of the combustor.

16. The method of claim 15, further comprising injecting a greater amount of the steam during high-power conditions of the combustor than during mid-power conditions of the combustor.

17. The method of claim 10, further comprising mixing the combustion gases with the steam to generate a steam-combustion gases mixture in the trapped vortex cavity.

18. The method of claim 17, further comprising injecting the steam-combustion gases mixture from the trapped vortex cavity into the combustion chamber downstream of the first combustion zone.

19. The method of claim 10, further comprising generating a first vortex of compressed air in the second combustion zone, and generating a second vortex of the steam in the trapped vortex cavity.

20. The combustor of claim 1, wherein the trapped vortex cavity includes a first vortex of compressed air in the second combustion zone, and the steam forms a second vortex in the trapped vortex cavity.

* * * * *